(12) United States Patent
Busby

(10) Patent No.: US 10,689,811 B2
(45) Date of Patent: Jun. 23, 2020

(54) SYSTEM, APPARATUS AND RELATED METHOD FOR RAISED GROUND COVER MAT

(71) Applicant: Busby Enterprises Ltd, Rocky Mountain House (CA)

(72) Inventor: Casey Ross Busby, Rocky Mountain House (CA)

(73) Assignee: Busby Enterprises Ltd, Rocky Mountain House, CA (US)

( * ) Notice: Subject to any disclaimer, the term of this patent is extended or adjusted under 35 U.S.C. 154(b) by 0 days.

(21) Appl. No.: 15/964,817

(22) Filed: Apr. 27, 2018

(65) Prior Publication Data

US 2018/0313042 A1    Nov. 1, 2018

Related U.S. Application Data

(60) Provisional application No. 62/491,005, filed on Apr. 27, 2017.

(51) Int. Cl.
| | | |
|---|---|---|
| E01C 9/08 | (2006.01) | |
| F16L 57/02 | (2006.01) | |
| E01C 5/22 | (2006.01) | |

(52) U.S. Cl.
CPC ............ *E01C 9/086* (2013.01); *E01C 5/223* (2013.01); *E01C 9/08* (2013.01); *F16L 57/02* (2013.01); *E01C 2201/12* (2013.01)

(58) Field of Classification Search
CPC .... F16L 1/06; E01C 5/005; E01C 9/08; E01C 9/086
USPC ................... 404/35, 40; 248/346.02; 428/45
See application file for complete search history.

(56) References Cited

U.S. PATENT DOCUMENTS

| 392,277 | A | * | 11/1888 | Loy | ........................ | E01C 5/005 |
| | | | | | | 404/40 |
| 2,382,789 | A | * | 8/1945 | Guignon, Jr. | ........... | E01C 9/086 |
| | | | | | | 404/36 |
| 2,653,525 | A | * | 9/1953 | McGuire | ................ | E01C 9/086 |
| | | | | | | 404/35 |
| 3,256,785 | A | * | 6/1966 | Stammbach | ............ | E01C 9/083 |
| | | | | | | 404/35 |
| 3,611,609 | A | * | 10/1971 | Reijnhard | ............ | A63H 33/086 |
| | | | | | | 446/121 |
| 4,226,064 | A | * | 10/1980 | Kraayenhof | ........... | A01K 1/015 |
| | | | | | | 404/35 |

(Continued)

*Primary Examiner* — Thomas B Will
*Assistant Examiner* — Katherine J Chu
(74) *Attorney, Agent, or Firm* — CPST Intellectual Property Inc.; Santosh K. Chari

(57) ABSTRACT

A ground cover mat for vehicles and equipment to cross over pipes, whether laid below or above ground, wherein the mat comprises two footing members spaced at a distance from each other. Each of the footing members define therein multiple peg holes, and each of the peg holes spaced at different distances from an outer edge of a given footing member. The mat also includes one or more span members. Each of the span members are positioned above and removably attached to the two footing members. Each of the one or more span members comprise at least two pegs that protrude downwards, wherein one of the pegs removably fit into a given peg hole defined in one of the two footing members and another one of the pegs removably fit into a given peg hole defined in another one of the two footing members.

9 Claims, 23 Drawing Sheets

(56) References Cited

U.S. PATENT DOCUMENTS

| | | | | |
|---|---|---|---|---|
| 4,362,426 A * | 12/1982 | Ruckstuhl | E01C 5/005 | 404/40 |
| 4,430,837 A * | 2/1984 | Kirschenbaum | E04F 15/02 | 404/40 |
| 4,461,131 A * | 7/1984 | Pressell | E04F 15/02 | 52/395 |
| 5,418,036 A * | 5/1995 | Tokikawa | E04F 21/18 | 404/134 |
| 5,713,175 A * | 2/1998 | Mitchell | E01C 5/005 | 108/156 |
| 6,029,583 A * | 2/2000 | LeTrudet | B65D 19/0012 | 108/57.25 |
| 6,050,044 A * | 4/2000 | McIntosh | A63H 33/082 | 446/124 |
| 6,451,400 B1 * | 9/2002 | Brock | A47L 23/24 | 15/161 |
| 6,453,632 B1 * | 9/2002 | Huang | E04F 15/04 | 52/385 |
| 6,467,224 B1 * | 10/2002 | Bertolini | E01C 5/22 | 404/35 |
| 6,585,449 B2 * | 7/2003 | Chen | E01C 11/18 | 404/2 |
| 7,914,228 B2 * | 3/2011 | Rapaz | E01C 5/005 | 404/34 |
| 7,918,623 B2 * | 4/2011 | Lacroix | E01C 5/005 | 404/35 |
| 7,984,599 B2 * | 7/2011 | Snell | E01C 5/005 | 52/586.1 |
| 8,464,490 B2 * | 6/2013 | Rapaz | E04C 2/20 | 52/592.1 |
| 8,683,769 B2 * | 4/2014 | Cerny | E01C 5/001 | 404/36 |
| 8,747,018 B2 * | 6/2014 | Smith | E01C 5/18 | 404/29 |
| 8,881,482 B2 * | 11/2014 | Cerny | E04F 15/02038 | 52/582.2 |
| 8,936,374 B1 * | 1/2015 | Royse | F21V 33/006 | 362/153 |
| 9,010,060 B2 * | 4/2015 | Rapaz | E04C 2/34 | 52/592.1 |
| 9,011,036 B2 * | 4/2015 | Smith | E01C 5/001 | 404/29 |
| 9,194,085 B2 * | 11/2015 | Smith | E01C 5/18 | 404/29 |
| 9,972,942 B1 * | 5/2018 | Bordelon | E04H 3/126 | |
| 10,145,124 B2 * | 12/2018 | Tosolini | E04F 15/02405 | |
| 2011/0142539 A1 * | 6/2011 | Sekine | E01C 9/08 | 404/35 |
| 2012/0063844 A1 * | 3/2012 | Wold | E01C 5/14 | 404/35 |
| 2013/0047351 A1 * | 2/2013 | Breault | E02D 17/10 | 14/24 |
| 2013/0309008 A1 * | 11/2013 | Fournier | E01C 9/08 | 404/35 |
| 2014/0286704 A1 * | 9/2014 | Bennett | E01C 13/08 | 404/35 |
| 2015/0337988 A1 * | 11/2015 | Huang | F16L 1/14 | 405/184.4 |
| 2019/0119862 A1 * | 4/2019 | Penland, Jr. | E04F 15/105 | |

* cited by examiner

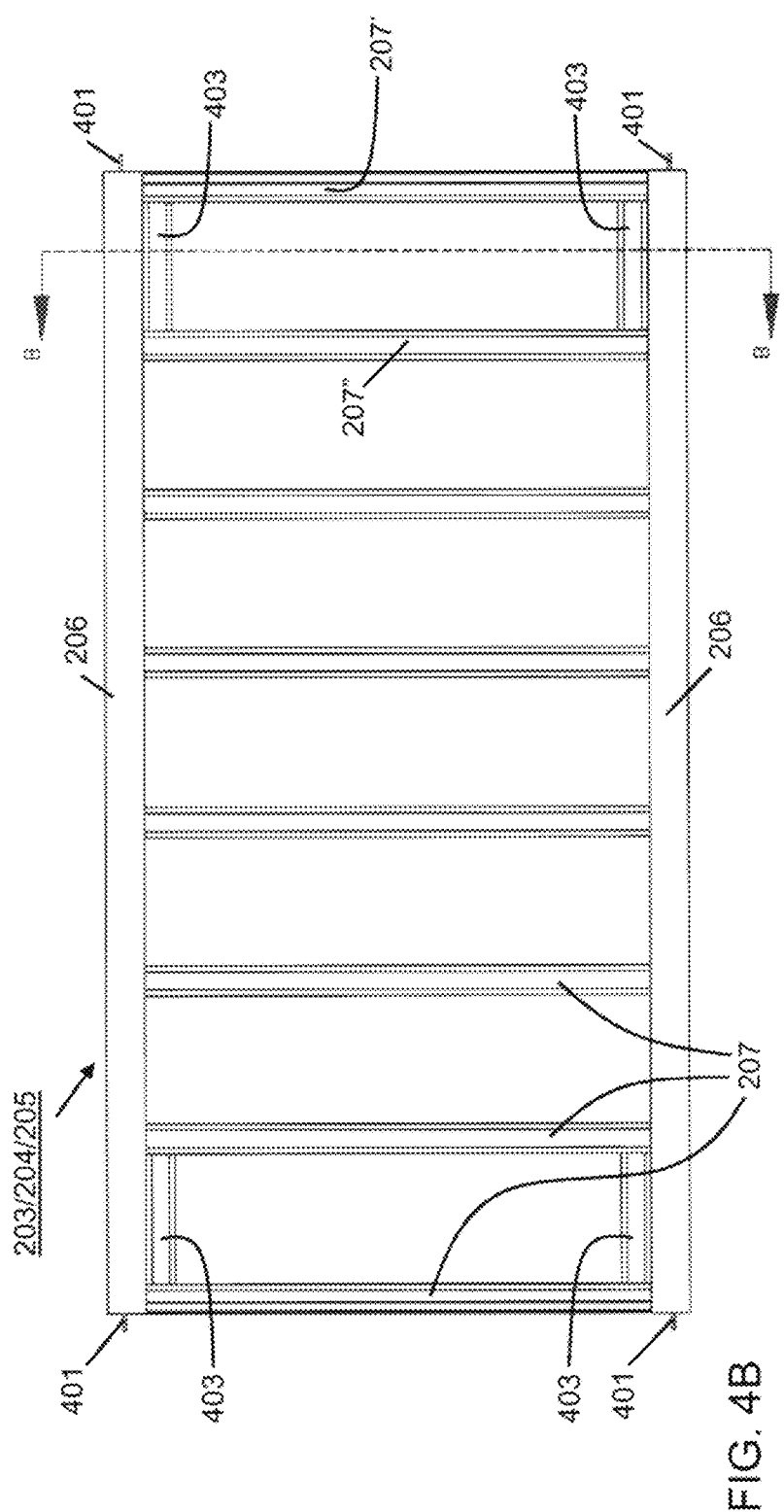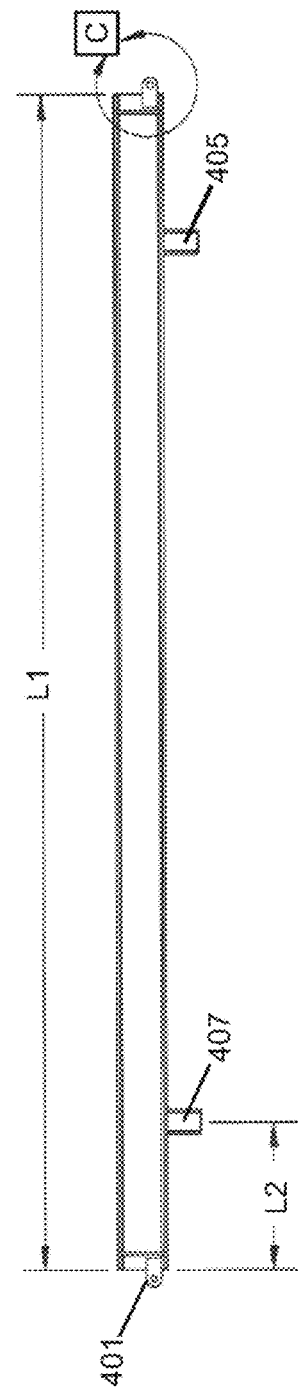
FIG. 4B
FIG. 4C

SYSTEM, APPARATUS AND RELATED METHOD FOR RAISED GROUND COVER MAT

CROSS-REFERENCE TO RELATED APPLICATION

This application claims priority to U.S. provisional patent application No. 62/491,005 filed on Apr. 27, 2017, the entire contents of which are incorporated herein by reference.

TECHNICAL FIELD

The following description generally relates to raised ground cover mats.

BACKGROUND

Ground cover mats are used in constructions sites to cover areas of ground and to allow vehicles and heavy machinery to drive over the ground cover mats. Typically, the ground cover mats are placed over pipelines, surface lines (e.g. fluid hoses, power cables, data wires), and other objects that are to be protected. Ground cover mats are also placed over ground surfaces that could be problematic for vehicles and heavy machinery to cross over. For example, soft ground, holes, ditches and streams may be covered by a ground cover mat to enable vehicles or heavy machinery to cross over.

In the pipeline industry, pipelines are buried underneath, laid upon, or supported in a raised position above a ground surface. Because of the distances travelled by such pipelines, and other factors, it is often necessary for a road or passage to cross a pipeline. For buried pipelines, the crossing passes over the pipeline, for example directly or indirectly above fill material above the pipeline. Regulations may determine the minimum depth of fill required between the pipeline and the road in some cases. Regardless, vibration and compression from multiple crossings over time may lead to damage and eventual failure of the buried pipeline. Therefore, ground cover mats may be laid over a pipeline for machinery to cross over.

Ground cover mats are also called swamp mats, rig mats, and pipeline mats. These mats are typically intended to be easy to setup and are temporarily used. Ground cover mats are typically low profile so that less soil or dirt is required to form a ramp leading up to the ground cover mat in order for vehicles or heavy machinery to cross over the ground cover mat. A low profile also makes it easier for vehicles or heavy machinery to traverse over the ground cover mat.

In many cases, ground cover mats are created using planks of wood that are fastened together to form a board. In some cases, oak wood is used to create "oak mats". These wood mats are easy to assemble on site, but are not durable and may not be able to withstand the loads of the heaving machinery and vehicles. Consequently, the pipeline or other object under the wooden mats may be damaged by a heavy vehicle.

US patent application publication no. 2013/0047351 describes a pipeline crossing bridge. The arch-shaped bridge is of a fixed size and is constructed to be one piece that is placed over a pipeline.

U.S. design Pat. No. 763,414 shows a fluid line drive over. It is one piece having a smooth top surface and includes pipes extending through the interior of the structure. This design patent does not describe supporting feet to raise the structure above a ground surface.

U.S. Pat. No. 8,955,184 describes a bridge comprising multiple bridge elements configured to be superimposed when the bridge is in a first non-deployed position. The bridge elements are initially vertically stacked and each two successive bridge elements are connected using a pair of parallel coupling arms positioned at the sides of the bridge elements. The coupling arms are used to articulate the bridge elements outwards to form a bridge that spans across a gap. The bridge elements can be removed from the stack to vary the length of bridge. This patent does not describe supporting feet to raise the bridge above a ground surface.

U.S. Pat. No. 3,768,108 describes an arched bridge that includes a pair of arched longitudinal opposite side structural members interconnected by crossed diagonal bracing members secured there-between by bolting. This bridge is intended to be of a fixed size. Furthermore, while this bridge is intended to be shipped disassembled and assembled on site, the assembly is time consuming as there are many parts.

U.S. Pat. No. 5,603,134 describes a portable bridge system formed from at least a pair of rectangular bridge platforms positioned in side-by-side relationship including end locking plates for locking the platforms together at the end regions thereof.

US patent application publication no. 2013/0284872 describes a pipeline mat. While this pipeline mat is constructed as one piece, the pipeline mat includes a slidably replaceable top layer material, such as wood planks, for repair purposes. Each wood plank is cut to a finished dimension with L-shaped notches at its ends in order to slide beneath the metal frame. This patent application does not describe supporting feet to raise the mat.

SUMMARY OF THE INVENTION

Examples embodiments of the invention are provided below, including example aspects of such embodiments. Additional features of the embodiments as well as additional example embodiments are described in the figures and the detailed description.

In a general example embodiment, an adjustable ground cover mat includes two footing members that are spaced at a spanning distance from each other. Each of the footing members include a first lengthwise outer edge and a second lengthwise outer edge. Each of the footing members define therein multiple pairs of peg holes, and each pair of peg holes spaced at different distances from the first lengthwise outer edge. The peg holes within each pair of peg holes are spaced apart from each other by a first distance. The ground cover mat also includes one or more span members, with each of the span members positioned above and removably attached to the two footing members. In particular, each of the one or more span members include at least two pairs of pegs that protrude downwards, and the pegs within each of the pair of pegs are spaced apart from each other by the first distance. One pair of pegs removably fit into a given pair of pegs holes defined in one of the two footing members and another pair of pegs removably fit into a given pair of peg holes defined in another one of the two footing members.

In another general example embodiment, a kit of parts is provided, that when assembled form a ground cover mat. The kit of parts include two footing members that each include a first lengthwise outer edge and a second lengthwise outer edge. Each of these footing members define therein multiple pairs of peg holes, and each pair of peg holes are spaced at different distances from the first lengthwise outer edge. The peg holes within each pair of peg holes are spaced apart from each other by a first distance. The kit of parts further includes one or more span members having a first length. Each of the span members are configured to be positioned above and removably attached to the two footing members. In particular, each of the one or more span members include at least two pairs of pegs that protrude downwards, and the pegs within each of the pair of pegs are spaced apart from each other by the first distance. One pair of pegs removably fit into a given pair of pegs holes define in one of the two footing members and another pair of pegs removably fit into a given pair of peg holes defined in another one of the two footing members.

In another general example embodiment, a method is provided for assembling a ground cover mat. The method includes laying down two footing members on a ground surface. The two footing members spaced at a spanning distance from each other and oriented substantially parallel to each other. Each of the footing members include a first lengthwise outer edge and a second lengthwise outer edge. Each of the footing members define therein multiple pairs of peg holes, and each pair of peg holes are spaced at different distances from the first lengthwise outer edge. The peg holes within each pair of peg holes are spaced apart from each other by a first distance. The method further includes driving one or more ground spikes through one or more peg holes defined in each of the footing members. For example, the ground spikes are driven into the ground surface. The method further includes placing one or more span members above and removably attached to the two footing members. In particular, each of the one or more span members include at least two pairs of pegs that protrude downwards, and the pegs within each of the pair of pegs are spaced apart from each other by the first distance. One pair of pegs are removably fitted into a given pair of pegs holes defined in one of the two footing members and another pair of pegs are removably fitted into a given pair of peg holes defined in another one of the two footing members. The given pair of pegs holes defined in the one of the two footing members and the given pair of peg holes defined in the another one of the two footing members are unoccupied by the ground spikes.

In another general example embodiment, a ground cover mat includes two footing members spaced at a spanning distance from each other, and one or more span members. Each of the span members are positioned above and attached to the two footing members. Each of the one or more span members are constructed from a metal frame and planks, and the metal frame includes two outer beams connected by multiple cross bars. In particular, a given plank is positioned between a given two of the cross bars. The two outer beams include an upper flange, a lower flange and a web that is positioned between the upper flange and the lower flange. At least one of the upper flange and the lower flange overlap the planks to secure the planks to a given span member. In a further example aspect, the multiple cross bars have at least a partially rounded cross-section, and the planks are rough lumber.

BRIEF DESCRIPTION OF THE DRAWINGS

Embodiments will now be described by way of example only with reference to the appended drawings wherein:

FIG. 4B is a top view of the frame of the span member shown in FIG. 4A.

FIG. 4C is a side view of the frame of the span member shown in FIG. 4A.

DETAILED DESCRIPTION

Figure 1:
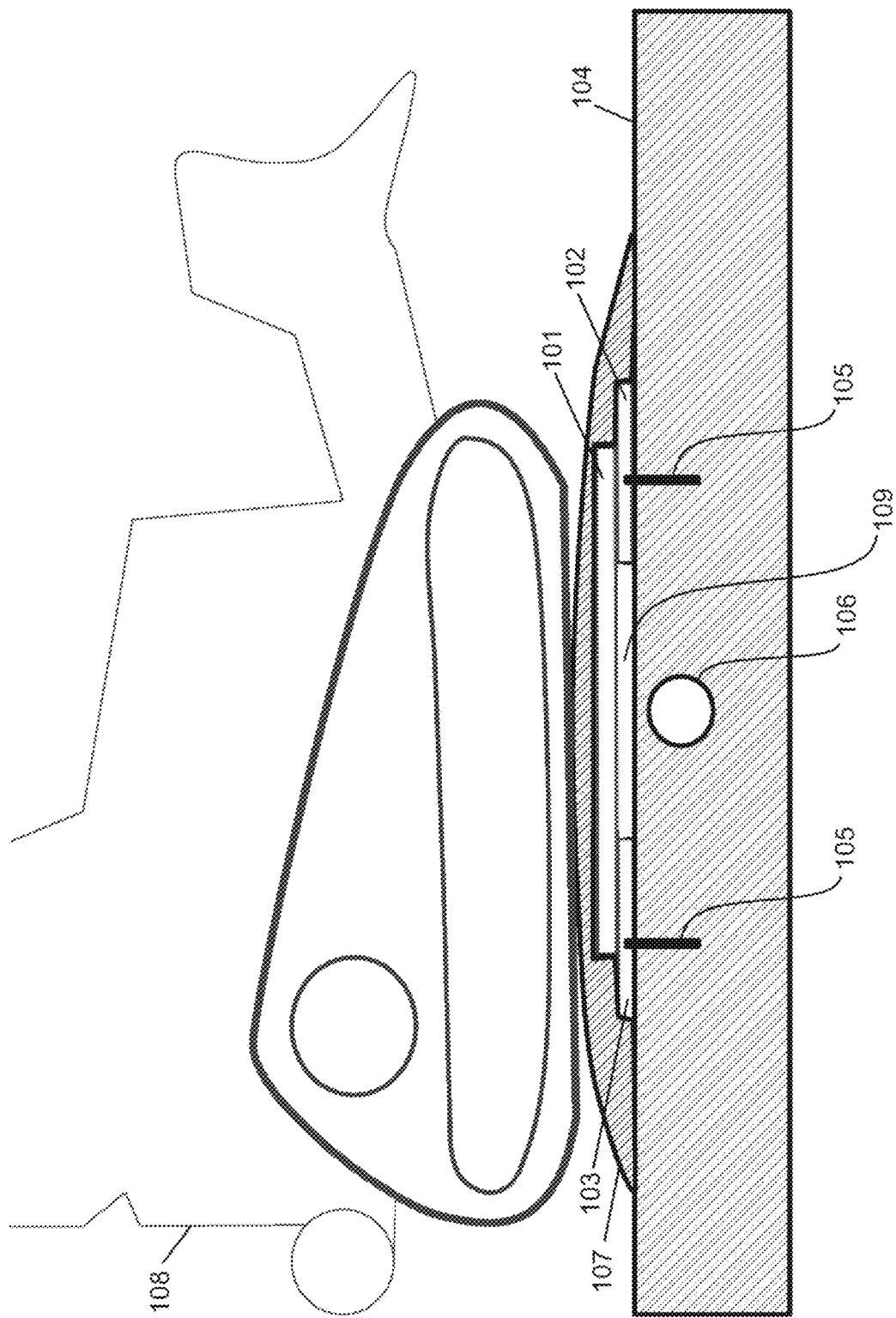
FIG. 1 is a diagram showing an example cross-section of a ground cover mat installed above an underground pipe with a vehicle driving above the ground cover mat.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is herein recognized that typical ground cover mats constructed from primarily wood planks will degrade or rot over time. Furthermore, the strength of these ground cover mats is in question, since they may not be designed or tested to hold the weight of heavy machinery and vehicles.

It is further herein recognized that ground cover mats are typically used in remote areas. Therefore, shipping materials may be difficult. It is also desirable to be able to create a ground cover mat that suits the needs of the physical environment. However, the conditions of the physical environment are difficult to plan, especially in remote areas. For example, in one section of a work site, technicians or builders desire to create a ground cover mat of a first given span, but in a different section of the work site, technicians or builders desire to create a ground cover mat of a second given span. Existing ground cover mats that are of a fixed size would not be suitable to these variances in the physical environment. In other words, there are different sized objects, or different sized gaps, or different sized ground features to cross over, and it is difficult to predict these variances. Furthermore, attempting to bring different sized ground cover mats or very large ground cover mats to remote areas in order to accommodate these variances would not be practical.

It is further herein recognized that, while ground cover mats are typically not permanent, existing ground cover mats may slide over the ground surface. Typically, dirt is placed around the ground cover mat to hold it in place, but this is not necessarily effective and may still be prone to shifting as vehicles or machinery repeatedly drive over the ground cover mat. Furthermore, in slippery conditions, such as slopes, snowy surface, muddy surfaces, icy surfaces, rocky surfaces, etc., ground cover mats are even more susceptible to shifting over the ground. Rainy weather, snowy weather, high wind, or other weather conditions may also cause a ground cover mat to shift. Furthermore, heavy machinery or equipment may knock the sides or edges of the ground cover mat, causing the ground cover mat to shift. If the ground cover mat shifts, then the object that is to be protected below the ground cover mat may be at risk to being damaged. Or, a shifting ground cover mat positioned over a gap, a stream or another ground feature, may lead to a vehicle or a machine getting stuck while crossing over the ground cover mat. Therefore, it is herein recognized that the ground cover mat should be anchored to the ground.

It is further herein recognized that a ground cover mat should be rugged and durable, so that it can handle heavy machinery or large vehicles crossing over the ground cover mat. For example, vehicles with metal tracks, heavy machinery with push blades, and other types of vehicles may cross over the ground cover mat.

It is further herein recognized that the many ground cover mats are not easy to transport due to their large size. In particular, transport trucks have limited load dimensions, and it is desirable to transport a ground cover mat using conventionally sized transport trucks. While some ground cover mats or bridges can be assembled on site, these structures typically require many parts and therefore, many assembly steps. It is herein recognized that it is desirable to assemble a ground cover mat in a quick manner with less effort.

It is also herein recognized that certain parts, such as wood parts, may break down or degrade, and that it is desirable to replace these wood parts on-site. It is also herein recognized that it is difficult to obtain dimensional lumber, or dressed lumber, in remote areas. Instead, rough lumber is typically more readily available in remote areas. Using rough lumber in a ground cover mat is challenging since rough lumber may be twisted, cupped and bowed to varying extents. In other words, rough lumber may have variation in width and thickness.

The proposed example ground cover mat and related methods address one or more of the above issues.

In an example embodiment, the ground cover mat includes the following main components: one or more span members, and at least two footing members. A given span member sits on top of the two footing members, creating an air gap below the given span member. In particular, the two footing members are spaced apart from each other. In an example embodiment, the footing members are substantially parallel to each other.

In an example aspect, a combination of a metal frame and wood planks form each of the span members and the footing members.

In an example aspect, the span members and the footing members can be disassembled and assembled on site. In an alternative example, the span members and the footing members are fixed to each other, for example, by welding.

The top surface of the span member or span members forms a top surface that is raised above the ground. Equipment or a vehicle can drive over the ground cover mat.

In an example of an adjustable ground cover mat, each footing member has multiple peg holes at different positions, each of the one or more span members has pegs that insert into the peg holes. A person assembling the ground cover mat selects the distance between the footings by using certain peg holes to mate with the pegs of the span member.

In another example, the span members come in different dimensions, which provides additional adjustability in the span of the ground cover mat.

Therefore, one or both of the following approaches may be used to adjust the length of the air gap under the span member: 1) selecting the peg holes; and 2) selecting the size of the span member.

The ground cover mat is assembled on site, which makes transportation of the parts easier. The adjustability features allows a person to adjust the length of the air gap under the span member to cover a pipe while on site.

In an example embodiment, a ground spike is driven through one or more unused peg holes of the footing members and into the ground below. This ground spike would serve to restrict the movement of the ground cover mat. The ground cover mat can be secured to a slope, soft ground, or slippery ground using the ground spikes.

In certain example embodiments, multiple span members are aligned and connected in order to span the entire width of the two footing members. In an example version, three span members are joined together over two footings.

The ground cover mat can accommodate undulations, and even twists because of the multiple span members.

In example construction of the ground cover mat, rough cut lumber pieces, which may have uneven surfaces and variations in dimensions, are placed between metal pipes that are used to form the frame. By using pipes, or other rounded bars with surfaces, it is easier to place the lumber between the pipes. Rough cut lumber is more readily available in the construction areas, which makes construction of the ground cover mat easier. Similarly, repairs using rough cut lumber will be easier as it is more readily available.

The lumber in the ground cover mat is not bolted down, but rather held in place by the pipes, the under bar support, the over strips and the end caps. The old lumber in the ground cover mat can be replaced by removing the end caps, sliding out the old lumber, and inserting the new lumber.

While the ground cover mats described herein are described in examples with respect to pipelines, whether below surface or above, and surface lines (e.g. hoses, power cables, data wires), it will be appreciated that the ground cover mat can also be placed over other objects that are to be protected. The ground cover mats described herein may also be placed over ground surfaces that could be problematic for vehicles and heavy machinery to cross over. For example, soft ground, holes, ditches and streams may be covered by a ground cover mat to enable vehicles or heavy machinery to cross over.

Turning to FIG. 1, a cross-section view of ground cover mat is shown in use over a pipe 106 laid under the ground surface 104. The ground cover mat includes two footing members 103 that are spaced apart from each other, and one or more span members 101 that sit on and are supported by the footing members. This creates an air gap 109 between the bottom surface of the one or more span members 101 and the ground surface 104.

When the ground cover mat is installed, span members 101 are positioned above the pipe 106 and the footing members 103 are positioned away from the pipe. In this way, when a vehicle 108 or other heavy machinery passes over ground cover mat, the weight is applied and distributed onto the ground surface in areas that are peripheral to the pipe, rather than directly above the pipe.

In the example shown in FIG. 1, ground spikes 105 are placed through holes defined in the footing members 102. The ground spikes extend down below the ground surface 104.

Additional dirt 107 may be placed over the top of the footing members and the top of the span members. The dirt creates a gradual ramp over the ground cover mat for vehicles to traverse. The dirt also protects the top surface of the ground cover mat from wear and tear. Other material, such as clay and wood mats may be placed over the ground cover mat.

FIGS. 2A to 2D show different view of an assembled frame of a ground cover mat 200 having adjustability features. The ground cover mat frame 200 includes two footing members 201, 202 and multiple span members 203, 204, 205. The frame is constructed from metal components and is shown in these figures without the wood planks so as to clearly show the components of the frame. While three span members are shown in this example embodiment, it will be appreciated that other embodiments of the ground cover mat can use a different number of span members.

In the example, the span member 203 includes two outer beams 206 that are connected to each other with multiple bars 207 that cross from one outer beam to the other outer beam. Wood planks are positioned between the spaces the bars 207, and are further held in place by the two outer beams 206. The outer beams 206, for example, are I-beams that have upper and lower flanges to hold the wood in place.

In an example embodiment, the bars 207 have a square-shaped cross-section but with tapered or rounded corners. This allows for wood planks to be more easily placed in between each pair of bars 207 during assembly and repair.

In an example embodiment, the bars 207 are pipes having a circular cross-section, which also helps to more easily insert the wood planks between two of these bars. Cross-sections that have rounded corners, or are generally rounded, or are circular, are especially helpful when the wood is rough lumber since rough lumber tends to have variances in shape.

In an alternative example embodiment, the bars 207 have edges. In another example embodiment, the wood is dimensioned lumber. In other example embodiments, other materials are used to form the planks that are placed between the bars 207. For example, concrete, plastic, composite materials, and other materials are used in alternative embodiments. In other words, different materials and different shapes may be used in the construction of the ground cover mat.

The footing members 201, 202 have a similar frame construction as the span members. In particular, a given footing member includes two long outer beams 211 that are connected by multiple cross bars 210. Wood planks are place between the spaces of the cross bars 210 and are held in place with the flanges of the outer beams 211. In an example embodiment, the outer beams 211 are I-beams having upper and lower flanges.

In an example aspect, the wood planks are rectangular pieces and do not have any notches. In other words, the wood planks can be easily and quickly formed by cutting the lumber to length. In another example, the wood planks are not held in place with screws, bolts, clips, adhesive or other types of similar fasteners. Therefore, assembling the wood planks with the metal frame requires less time, effort and components. In other words, in an example embodiment of the ground cover mat, each wood plank is held in place by the frame structure that surrounds each given wood plank.

Figure 2A:
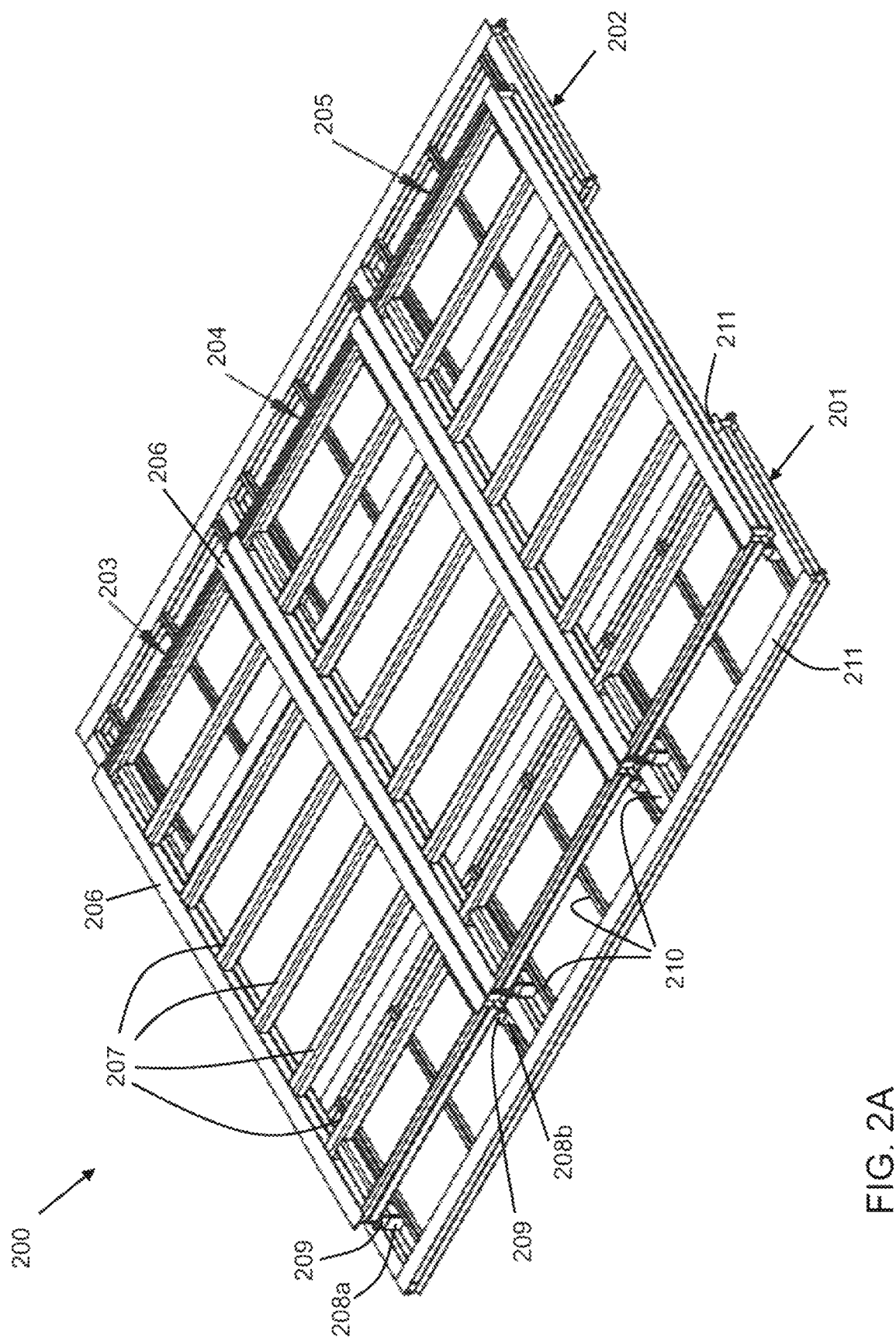
FIG. 2A is a perspective view of an example embodiment of a frame of an adjustable ground cover mat, but without planks.

As best shown in FIG. 2A, the footing members include peg holes that are defined within sleeves 208a, 208b. Pegs 209 that protrude downwards from a span member are shown to be inserted into the peg holes. This secures the footing members to the span members.

Figure 2B:
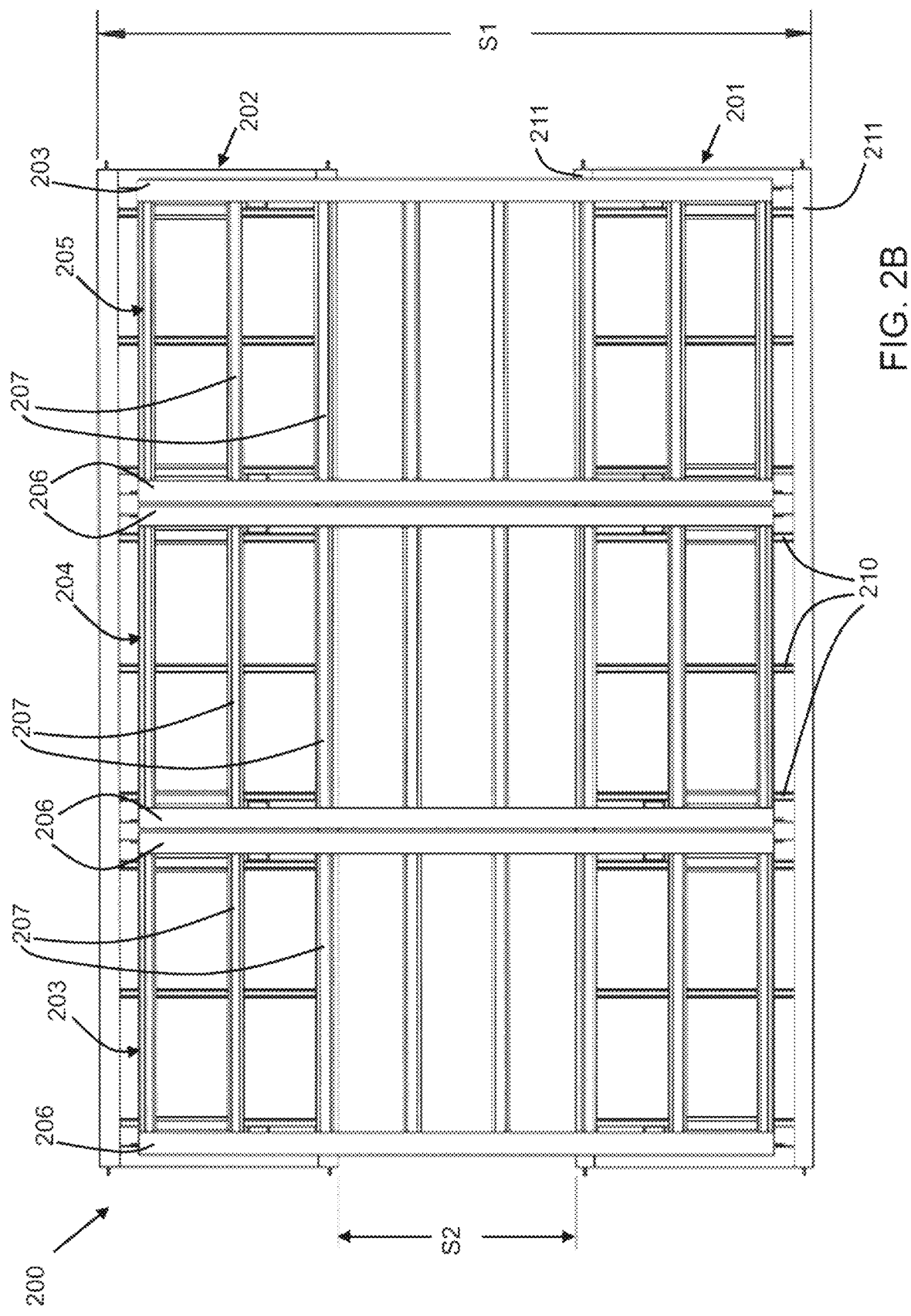
FIG. 2B is a top view of the frame of the ground cover mat shown in FIG. 2A.

As best shown in FIG. 2B, the spanning distance S2 between the inner sides of the footing members can be adjusted by placing the pegs into different peg holes. Alternatively, or in addition, a different length span member may be used to vary the distance S2.

It will be appreciated that the spanning distance S2, which determines the span of the air gap, can be selected based on the size of the object to cross over (e.g. crossing over a pipe, a cable line, etc.), or based on the size of the ground feature to cross over (e.g. a stream, a ditch, etc.). Changing S2 also accordingly changes the distance S1, which is the span distance between the outer sides of the footing members.

Figure 2C:
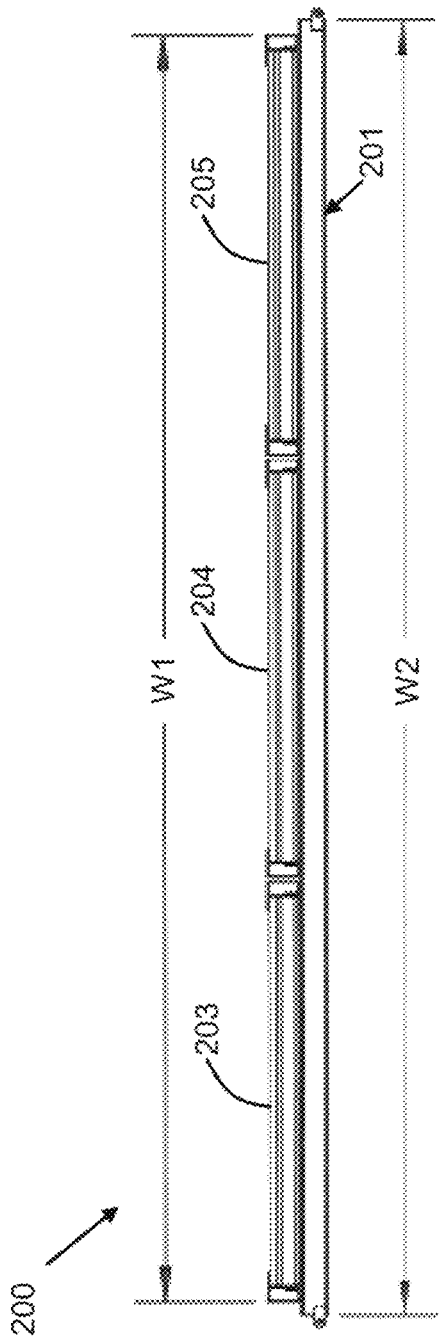
FIG. 2C is a front view of the frame of the ground cover mat shown in FIG. 2A.

FIG. 2C shows the overall width W1 of the assembled span members. W2 is the width of the entire ground cover mat, including the footing members, which in this embodiment is shown to be wider than W1.

However, in another example embodiment, W2 and W1 are equal, since the edge of the span members are flush with the edge of the footing members.

Figure 2D:
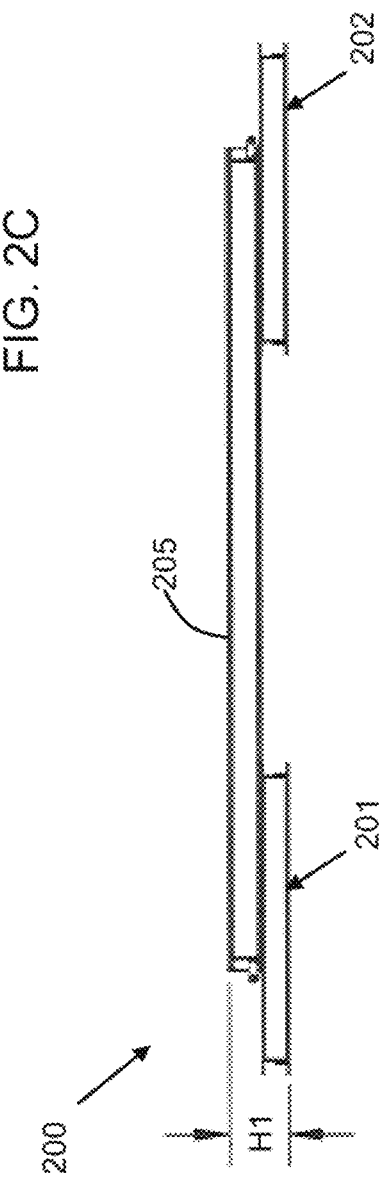
FIG. 2D is a side view of the frame of the ground cover mat shown in FIG. 2A.

FIG. 2D shows a side view. It can be seen that the height H1 is relatively small and low profile. This makes it easier for vehicles and equipment to traverse over the ground cover mat, since there is less disturbance or undulation in the grade of the ground surface even when the ground cover mat is installed.

In a non-limiting example embodiment, S2 is adjustable between approximately 48 inches, approximately 72 inches and approximately 96 inches, and S1 is respectively approximately 192 inches, approximately 216 inches or approximately 240 inches. W1 is approximately 296 inches. W2 is approximately 303 inches. H1 is approximately 14.0625 inches.

It will be appreciated that other dimensions and proportions, which are different from what is shown and described in the examples, are also applicable to the ground cover mat.

The ground cover mat 200 may be conveniently transported as a kit of parts that includes at least two footing members 201, 202, and one or more span members. In an example aspect, there are two span members. In an example aspect, there are three span members 203, 204, 205. In another example aspect, the kit of parts further includes two more ground spikes 105. In an example aspect, the ground spikes are shaped to fit within the peg holes positioned on the footing members.

Turning to FIGS. 3A to 3D, different views of a frame of a footing member 201, 202 is shown in isolation. The wood planks are not shown assembled with the frame in order to more clearly show the frame construction.

Figure 3A:
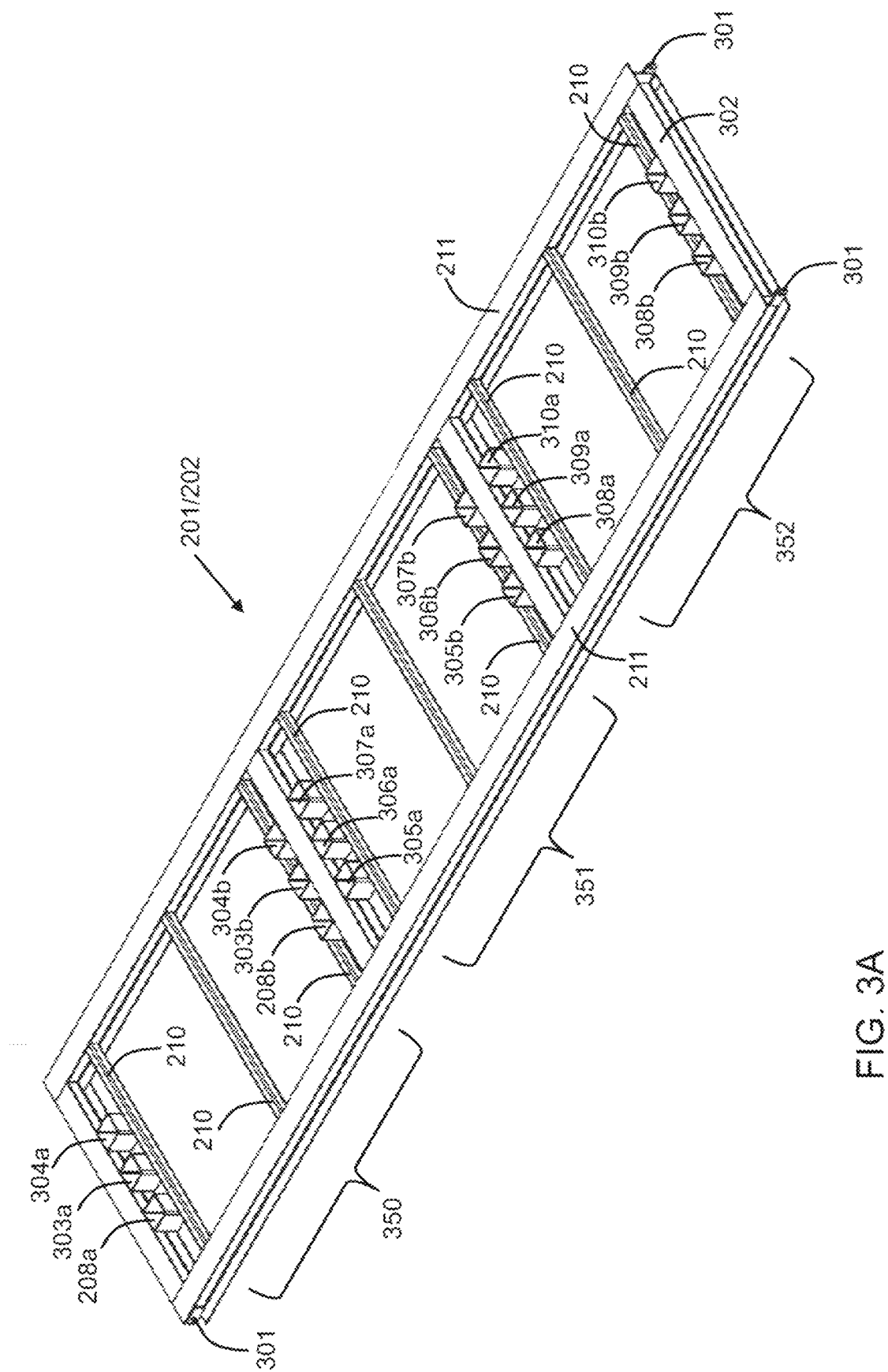
FIG. 3A is a perspective view of a frame of a footing member used in the adjustable ground cover mat shown in FIG. 2A, but shown in isolation.
Figures 3B, 3C:
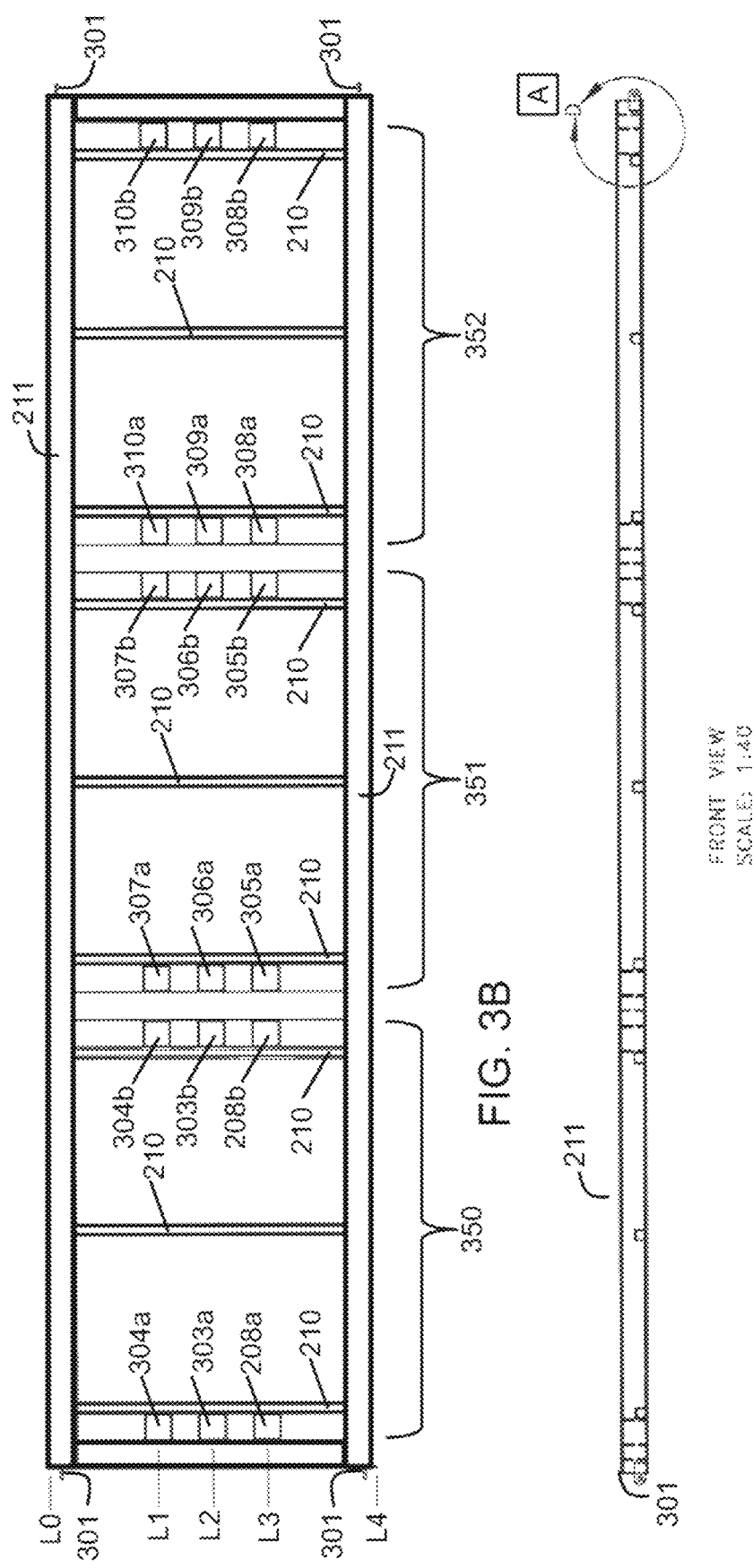
FIG. 3B is a top view of the frame of the footing member shown in FIG. 3A.
FIG. 3C is a front view of the frame of the footing member shown in FIG. 3A.

As best seen in FIGS. 3A and 3B, there are multiple pin holes defined in each footing member. In particular, there are multiple pairs of peg holes defined in each section of the footing member. For example, if the footing member is configured to be assembled with three span members, then there are at least three sections 350, 352, 352 within a given footing member to correspond with the three span members.

In the example shown, each peg hole is defined within a peg sleeve. The peg sleeve has a square-like cross-section and, for example, is formed from a section of a square pipe or bar with a hollow interior. The peg hole is sized and shaped to receive the peg on the span member. In other words, the peg has a complimentary square-like cross-section. In an example embodiment, the peg hole is slightly larger than the peg. The peg sleeve is formed from metal.

While a peg sleeve is shown, it will be appreciated that other structures may be used to define a peg hole. In general, other shapes of peg holes and other structures used to define the peg hole are applicable to the ground cover mat. In general, the peg hole and the peg should mate and restrict lateral movement between the footing member and the span member. Therefore, while the term "peg sleeve" is used in the example, it will be appreciated that alternative structures used to define a peg hole are applicable.

Returning to FIGS. 3A and 3B, in section 350, there are three pairs of peg sleeves. A first pair of peg sleeves 208a, 208b, a second pair of peg sleeves 303a, 303b, and a third pair of peg sleeves 304a, 304b are arranged at different distances from each other in order to vary the span.

In particular, in FIG. 3B, L0 represents a dimension line corresponding to the first outer edge of the footing member. L1, L2, and L3 represent dimension lines marking the position of the center of the peg holes defined respectively in peg sleeves 304a, 303a, and 208a. It will be appreciated that all the peg holes, and thus the peg sleeves, are horizontally aligned with the dimension lines L1, L2, L3. A first distance is defined between L0 and L1; a second distance between L0 and L2 is defined, and it is greater than the first distance; and a third distance between L0 and L3 is defined, and it is greater than the second distance.

L4 is the dimension line corresponding to the second outer edge of the footing member, opposite of L0. In an example embodiment, the distance between L0 and L1 and the distance between L3 and L4 are approximately the same. In this way, the footing member may be used in different orientations (e.g. rotated 180 degrees).

As will be appreciated, a first span member with a pair of pegs may be inserted at section 350 into the peg sleeve pairs 304a, 304b, or 303a, 303b or 208a, 208b.

Similarly, a second span member with a pair of pegs may be inserted at section 351 into the peg sleeve pairs 307a, 307b, or 306a, 306b, or 305a, 305b. Similarly, a third span member with a pair of pegs may be inserted at section 352 into the peg sleeve pairs 310a, 310b, or 309a, 309b, or 308a, 308b.

One or more of the peg holes that are not occupied, or that will not be occupied, by the pegs may be used to receive ground spikes. The ground spikes have a similar cross-section shape as the pegs and therefore are compatible with the peg holes. The ground spikes are placed through the unoccupied peg holes and into the ground, in order to anchor the footing member to the ground.

Figure 3D:
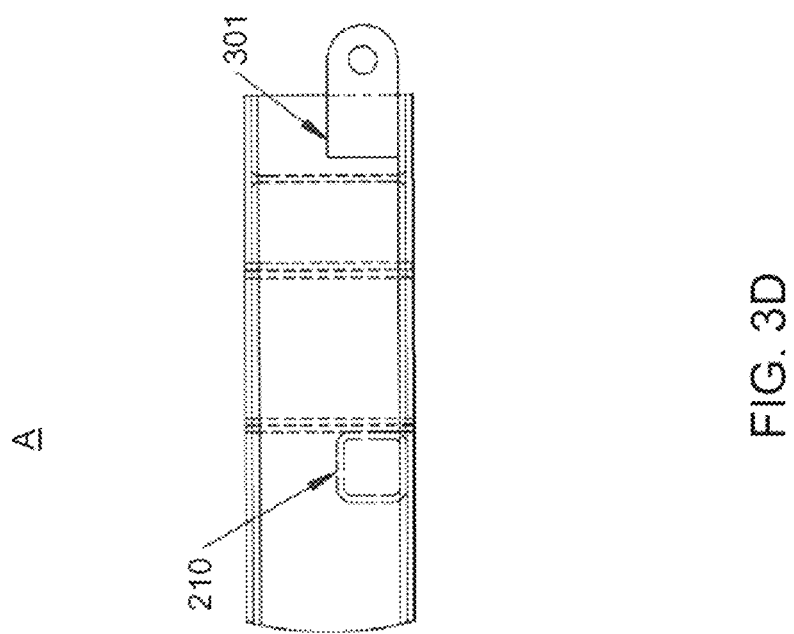
FIG. 3D is an enlarged view of a portion labeled 'A' in FIG. 3C.

FIG. 3D shows an enlarged section A taken from FIG. 3C. The lug 301 is shown protruding outwards and defining therein a hole to receive a bolt. The lugs 301 on different foot members, with the bolts and nuts, are used to connect multiple ground cover mats together to form a continuous and wide ground cover mat. This is beneficial when traversing over a long pipe, cable, ditch, or stream.

As shown in FIG. 3D, in an example embodiment, the cross bar 210 rests on the top surface of the bottom flange of the beams 211, where the beams 211 are I-beams.

FIGS. 4A to 4F show different views of a frame of a span member in isolation. The frame of the span member, for example, is used for the span member 203, 204 and 205. Again, the wood planks are not shown in these figures to more clearly show the frame construction. However, the wood planks are placed between the cross bars 207. The cross bars extend between two beams 206. For example, these beams are I-beams.

While many of the beams are I-beams in the ground cover mat, beams having other cross-section shapes may be used.

A given span member includes a lug 401 protruding from each corner. Two end caps 402 are positioned on opposite ends. In an example embodiment, the lugs are used for lifting the span member. In another example embodiment, the lugs are also used for alignment. For example, the lugs of two different span members are aligned with each other, and a bolt or a pin is placed through the holes defined respective in each lug. In this way, the lugs of different span members can be used to align with each other and maintain the alignment.

It will also be appreciated that there other mechanism can be used to align the span members with each other. For examples, clips, clasps, spring-loaded protrusions (e.g. detents), and magnets, are alternative mechanisms that may be used for alignment. Similarly, different fastening mechanisms, other than lugs, may be used to fasten together different instances of ground cover mats. For example, clips, clasps, spring-loaded protrusions (e.g. detents), and magnets are examples of different mechanisms to fasten together different instances of ground cover mats.

In the outer sections, a secondary cross bar 403 is placed between an outermost cross bar 207' and an immediately adjacent cross bar 207". As shown, there are two of these secondary cross bars 403 in the same section. A metal plate 404 is welded between the upper and the lower flanges of the I-beam. The plate is used to strengthen the corners of the flanges so that they do not bend inwards.

There are also four pegs 405, 406, 407, 408 that protrude downwards from the bottom of the span member. These four legs are positioned towards the corners of the span member.

In an example embodiment, the pegs are welded or adjoined to one of the structural components that form the frame of the span member.

As per FIG. 4C, different embodiment of the span member may have different length values L1. In this way, the spanning distance of the air gap may be varied. In one example embodiment, L1 is 16 feet. In another example embodiment, L2 is 20 feet. It will be appreciated that the distances for L1 may vary. In an example embodiment, the distance L2 between the peg and the outer edge of the span is 2 feet. However, other distances of L2 are applicable.

Figure 4A:
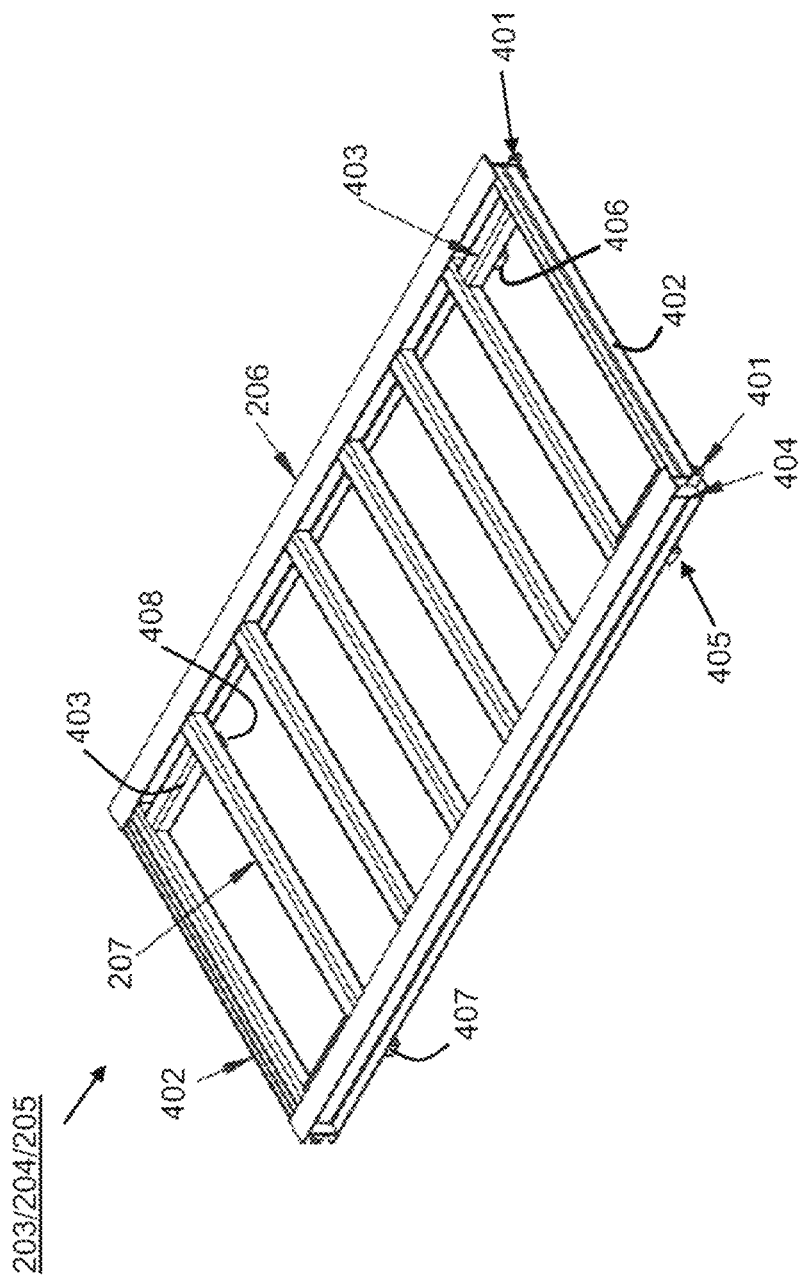
FIG. 4A is a perspective view of a frame of a span member used in the adjustable ground cover mat shown in FIG. 2A, but shown in isolation.
Figure 4D:
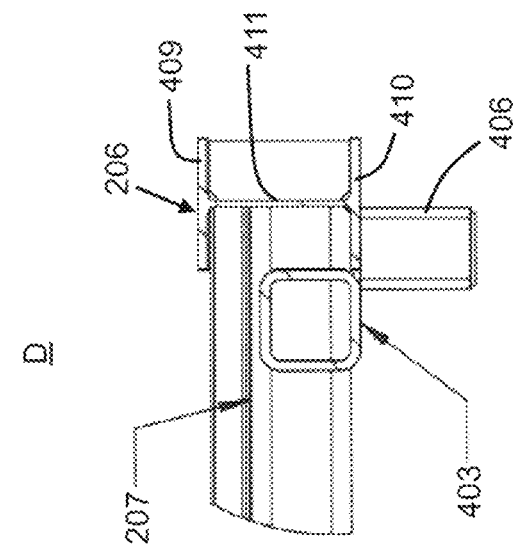
FIG. 4D is an enlarged view of a portion labeled 'C' shown in FIG. 4C.
Figure 4F:
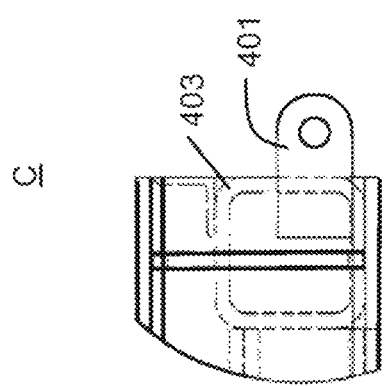
FIG. 4F is an enlarged view of a portion labeled 'D' shown in FIG. 4E.
Figure 4E:
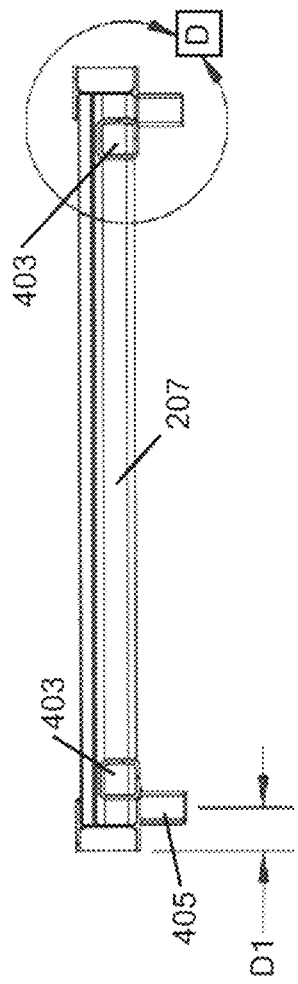
FIG. 4E is a cross-sectional view taken along the line B-B labeled in FIG. 4B.

From the cross-section view shown in FIG. 4E, taken along the lines B-B in FIG. 4B, the distance D1 between the peg and the other outer edge is shown.

In a non-limiting example embodiment, D1 is 5.5 inches. However, other distances may be used.

In an example embodiment, D1 is sized so that, in assembly, the span members are placed beside each other with little gap. See FIG. 2A, which shows three span members positioned within the peg holes and placed side-by-side with little gap. Other ways for determining or sizing D1 can be used.

Figure 5:
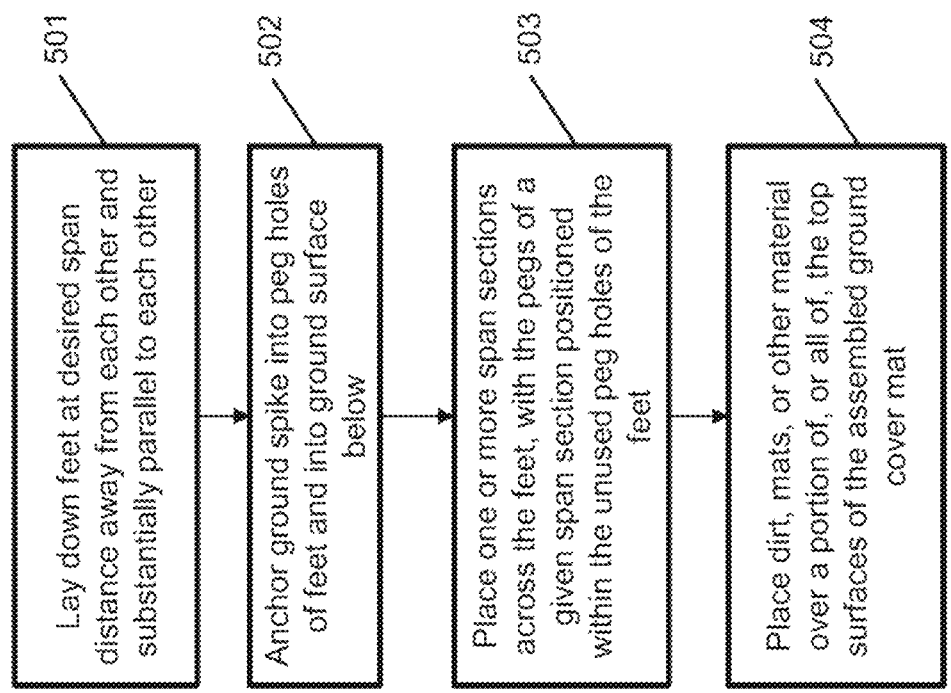
FIG. 5 is a flow diagram for an example process for assembling and installing an adjustable ground cover mat.

As shown in FIG. 4F, the bottom surface of the cross bar 207 rests on the top surface of the bottom flange 410. In particular, the beam 206 is an I-beam with top flange 409, a bottom flange 410 and a web 411 extending there between. The secondary cross bar 403 is flush with the bottom flange 410. FIG. 5 shows a method for assembling and installing an adjustable ground cover mat. For example, a kit of parts that includes the footing members, one or more span members, and ground spikes, can be used to assemble the adjustable ground cover mat. At block 501, the footing members are laid down at a desired span distance away from each other, and are oriented to be substantially parallel to each other.

For example, the span distance can be determined on-site based on the pipe or other obstacle to be crossed over. Accordingly, the ground cover mat can be adjusted on site to suit the desired span distance.

At block 502, the ground spikes are anchored through the peg holes and into the ground surface below. It will be appreciated that the ground spikes are not required to form the ground cover mat.

At block 503, one or more span sections are placed across the footing members with the pegs positioned within the unused or unoccupied peg holes.

At block 504, dirt, mats or other materials are placed over a portion of, or all of, the top surfaces of the assembled ground cover mat.

It will be appreciated that a ground cover mat that has already been installed on the ground can be disassembled and re-assembled according to a different desired span distance. It will also be appreciated that a ground cover mat that is already installed on the ground to create a first spanning distance, can later on be partially disassembled and readjusted to form a second spanning distance (i.e. which is different than the first spanning distance).

It will be appreciated that while the embodiment shown in FIG. 4 had each span member having four pegs, another example embodiment includes only two pegs at opposite ends of the span member. For example one of the two pegs fits into one footing member, and the other one of the two pegs fits into another footing member. Accordingly, the footing member of this assembly includes multiple pegs that are positioned to accommodate the pegs of the span members.

Figure 11:
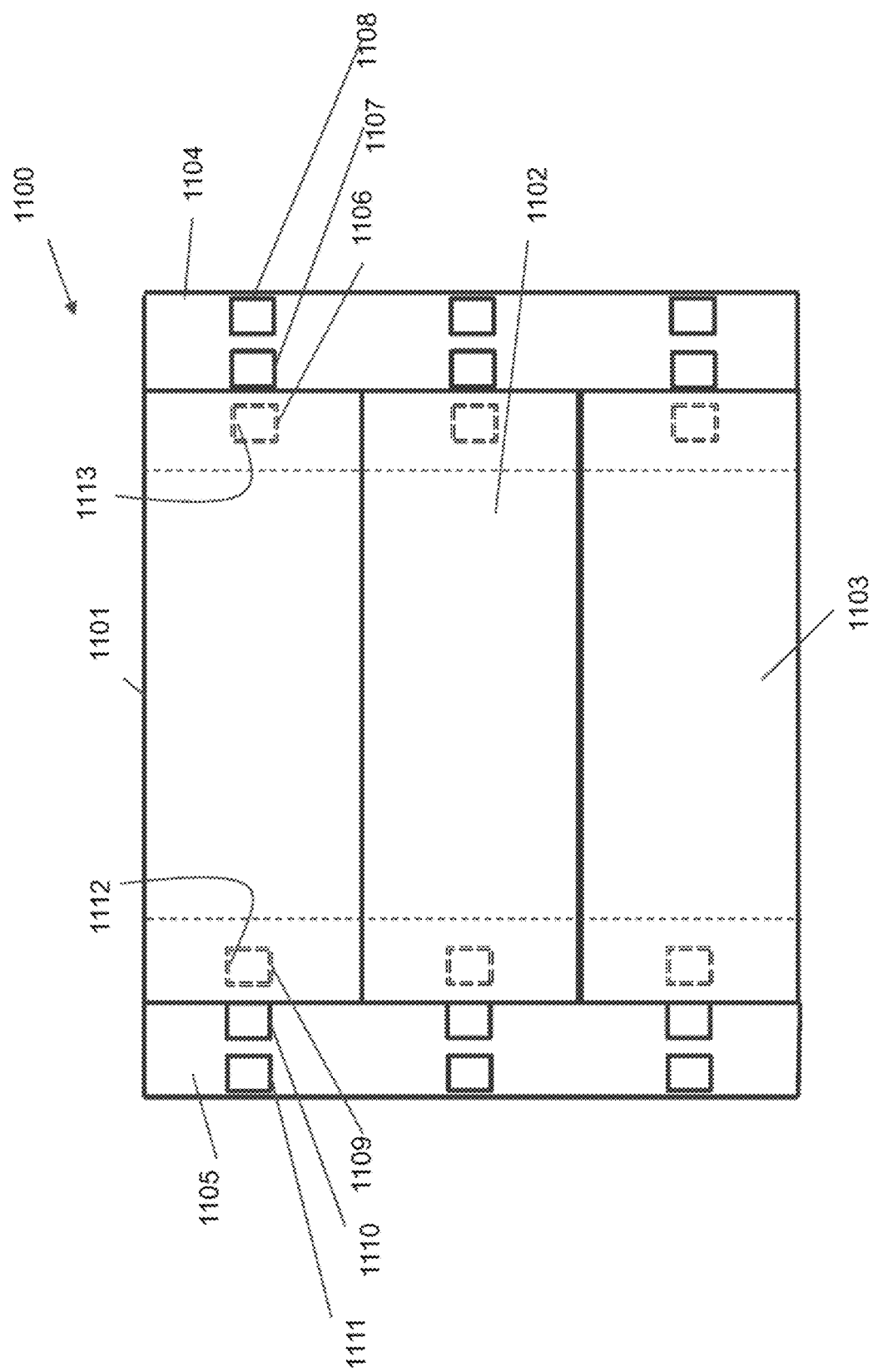
FIG. 11 is a top view of another example embodiment of a ground cover mat.

For example, turning to FIG. 11, another example embodiment 1100 of an adjustable ground cover mat is shown from the top view. The dotted lines represent parts of the structure not visible to the eye, but are located below the span members 1101, 1102, 1103. These span members are connected at opposite ends to a first footing member 1105 and a second footing member 1104.

The footing member 1104 has multiple peg holes 1106, 1107, 1108 that are collinear with each other, but are spaced at different distances away from an outer lengthwise edge of the footing member 1104. Similarly, the footing member 1105 has multiple peg holes 1109, 1110, 1111 that are collinear with each other, but are spaced at different distances away from an outer lengthwise edge of the footing member 1105.

The span member 1101 has two pegs 1112 and 1113 that are positioned at, or towards, opposite ends of the span member, and protrude downwards. Peg 1112 is removably fitted into the peg hole 1109 on the footing member 1105. Peg 1113 is removably fitted into the peg hole 1106 on the footing member 1104.

It will also be appreciated that while square shaped or rectangular shaped cross-sections are shown in the drawings for the pegs and the peg holes, other shapes are applicable to the pegs and the peg holes. For example, other examples of shapes include crescent shape, key-shape, circle shape, diamond shape, triangle shape, and trapezoidal shape.

One or more ground spikes may be driven through the unoccupied peg holes (e.g. 1107, 1108, 1110, 1111).

Turning to FIGS. 6A to 6F, different views of another example embodiment of a frame of a ground cover mat 600 is shown. This embodiment is not adjustable. The wood planks are not shown in the figures so as to more clearly show the frame construction. However, it will be appreciated that there are wood planks positioned within the frame.

The ground cover mat 600 includes two footing members 651 and a span member 650 that is fixed to the footing members 651.

The span member 650 is formed from two outer bars 609 that are connected by cross bars 620. For example, the cross bars are I-beams, but other shapes may be used to from the cross bars.

Above the cross bars 620 are pipes 603 that extend along the length of the span member. The pipes 603 are substantially parallel to the outer bars 609. Placed between the pipes 603 are wood planks that extend along the length of the span member. Although not shown, there are five wood planks that are placed between and are separated by the pipes 603. In an example embodiment, the wood planks are rough lumber. In another example embodiment, the wood planks are dimensioned lumber. In another example embodiment, the planks are made from material other than lumber, including but not limited to composites, plastics and metal.

An end bar 605 is placed on opposite ends of the span member 650, and each end bar is substantially perpendicular to the outer bars 609. Metal strips 611 are secured to the top surfaces of the outer bars 609 and are used to hold the planks in place.

In an example construction of the span member, the wood planks are fit into their respective pockets between the pipes, and then the metal strips 611 are secured into place. In an example construction, the metal strips are welded to the top surfaces of the outer beams.

The frame of each footing member 651 is similarly constructed using pipes 604, strips 610, planks placed between the pipes (not shown), and end bars 607. A right angled bracket 606 includes a horizontal flange extending into the space between the bars, so that the planks sit on top of the horizontal flange.

It will be appreciated that the end bars 607 may be hollow or solid. In an example embodiment, an end bar is hollow and an end cap 608 is placed on each end of the end bar so that there is no opening through the length of the end bar. The end cap 608 is most clearly seen in FIG. 6F.

Figure 6A:
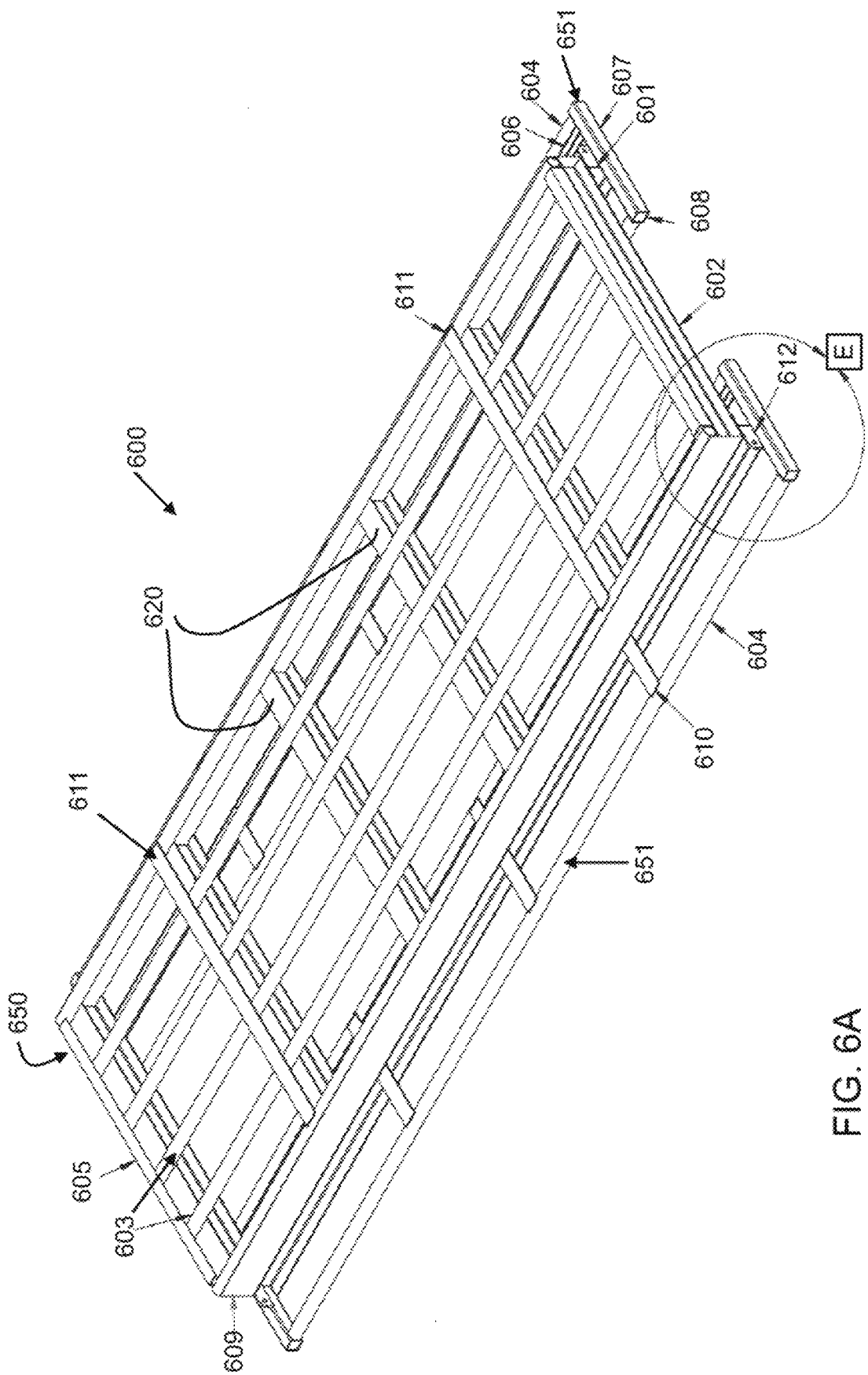
FIG. 6A is a perspective view of another example embodiment of a frame of a ground cover mat, but without the planks.
Figure 6B:
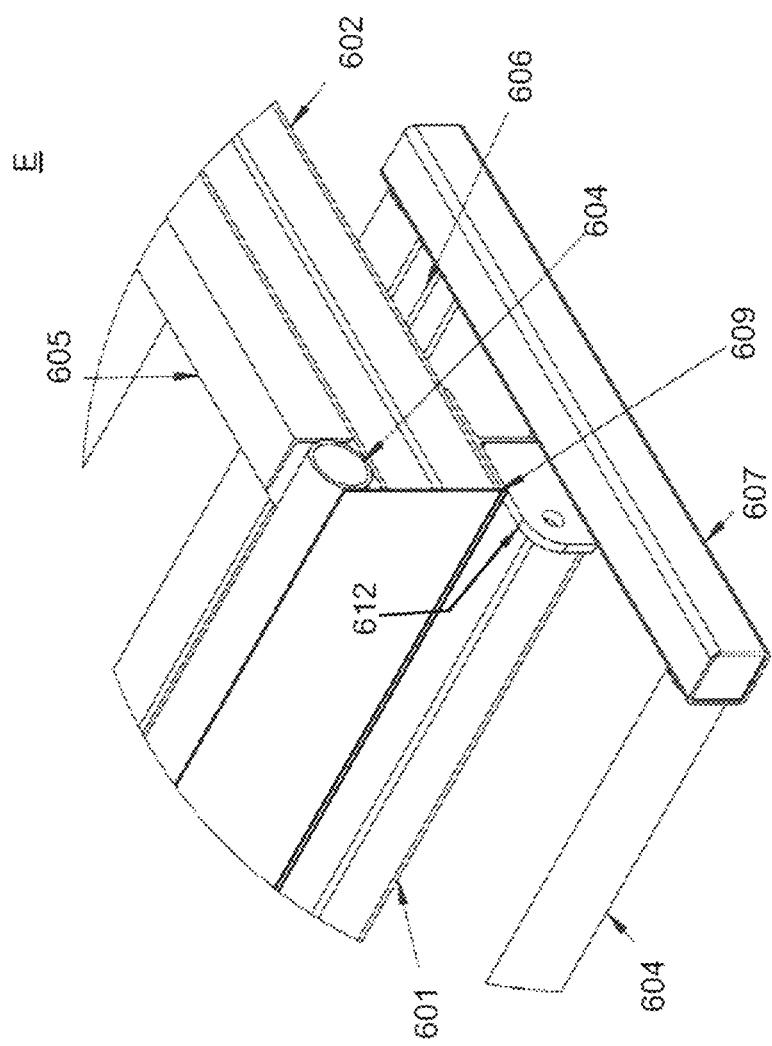
FIG. 6B is an enlarged view of a portion labeled 'E' shown in FIG. 6A.
Figure 6C:
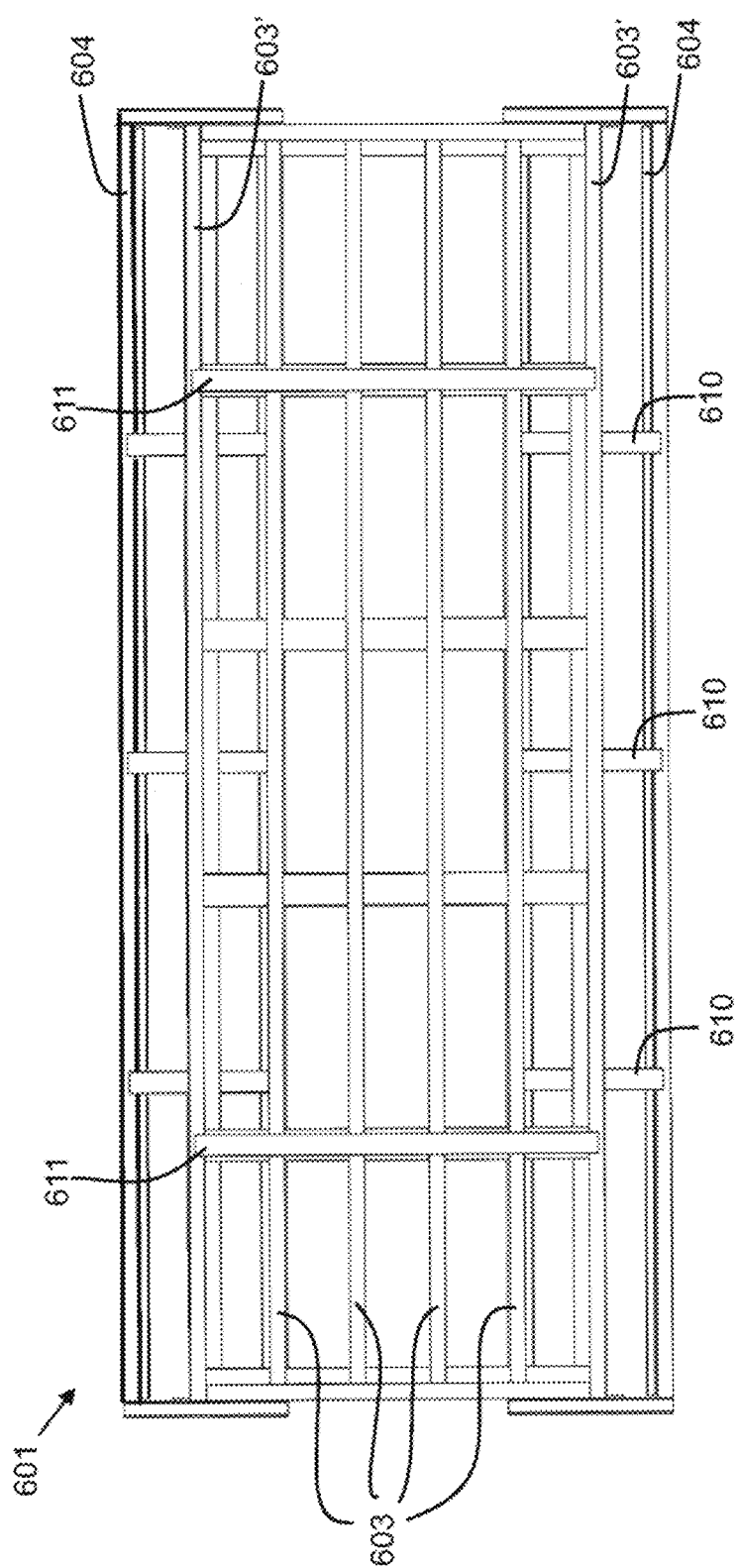
FIG. 6C is a top view of the frame of the ground cover mat shown in FIG. 6A.
Figure 6D:
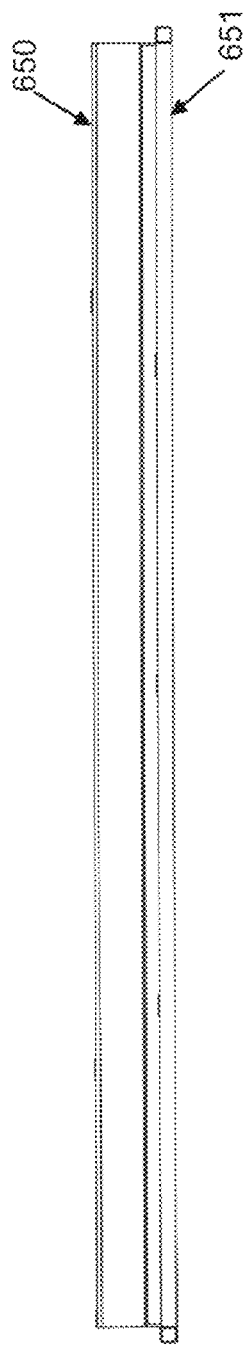
FIG. 6D is a front view of the frame of the ground cover mat shown in FIG. 6A.
Figure 6F:
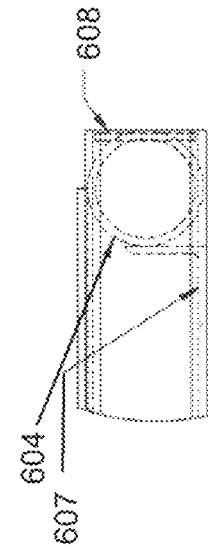
FIG. 6F is an enlarged view of a portion labeled 'F' shown in FIG. 6E.

A supporting beam 601 connects each footing member to the span member. The supporting beam 601 is best shown in FIG. 6B and it extends along the length of the span member. In an example embodiment, the supporting beam is an I-beam, as shown in FIG. 6B, but other shapes of beams may be used.

Figure 6E:
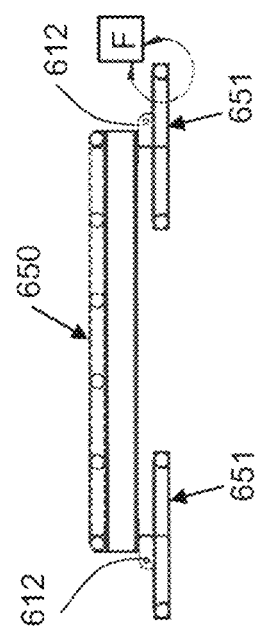
FIG. 6E is a side view of the frame of the ground cover mat shown in FIG. 6A.

As best seen in FIGS. 6B and 6E, each corner of the ground cover mat has a lug 612 that is used to connect adjacent ground cover mats together. For example, an assembly of multiple ground cover mats is laid over a length of pipe. For example, turning briefly to FIG. 9, a first ground cover mat 200a is connected to a second ground cover mat 200b.

In an example embodiment, the height of the ground cover mat is approximately 15 inches. Other ground cover mats having different heights are applicable to the principles described herein.

In an example embodiment, the pipes 604 used in the footing member are longer than the pipes 603 in the span member. In another example embodiment, the span member also includes two pipes 603' that are each positioned at the outer edges and which are longer than the interior positioned pipes 603. These outer pipes 603' are, for example, substantially the same length as the pipes 604 in the footing member.

Figure 7:
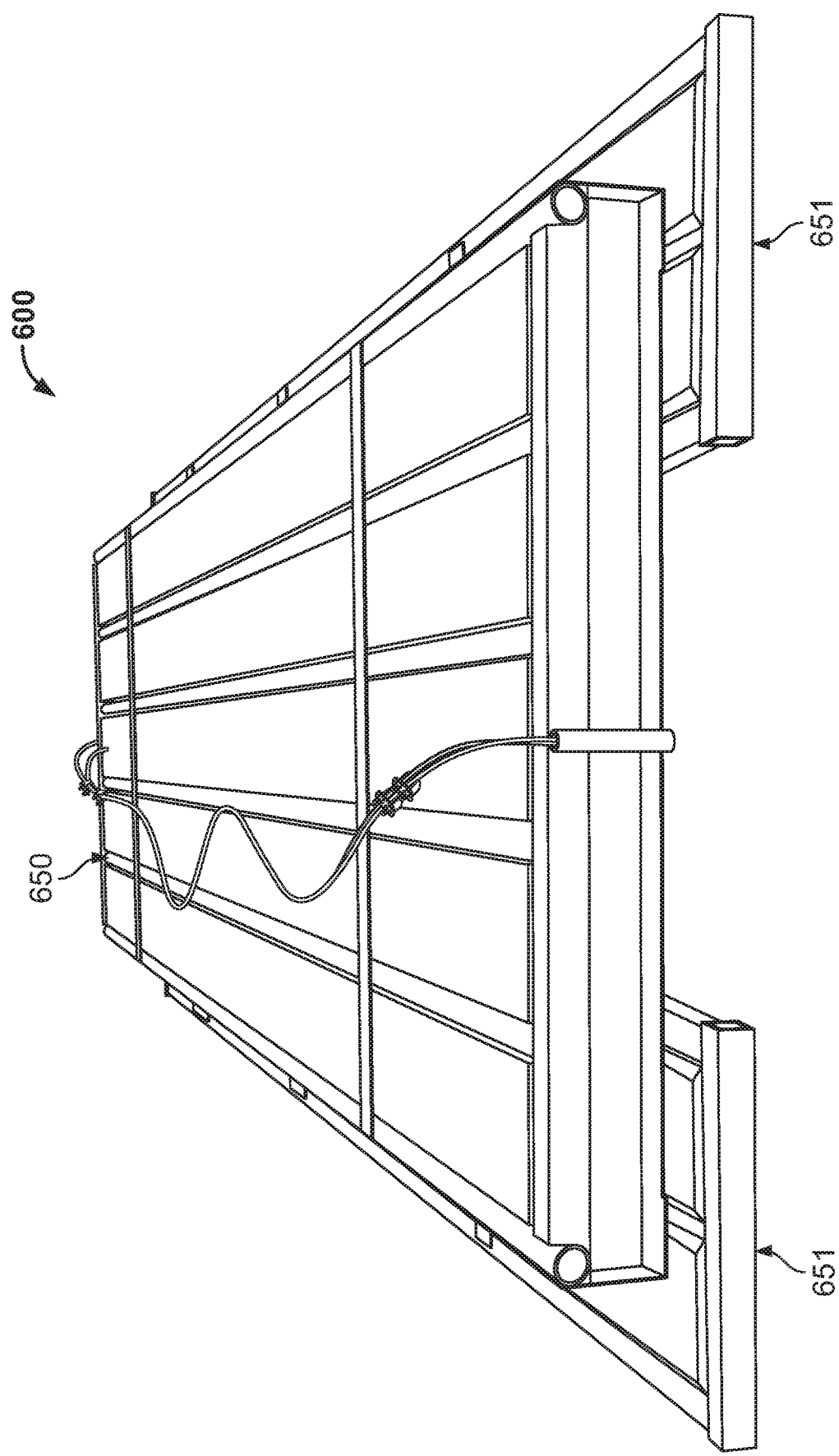
FIG. 7 is a perspective view of an example embodiment of a ground cover mat that includes wood planks positioned within the frame.

FIG. 7 shows the ground cover mat shown in FIGS. 6A-6F, but including the wood planks placed between the pipes.

Figure 8A:
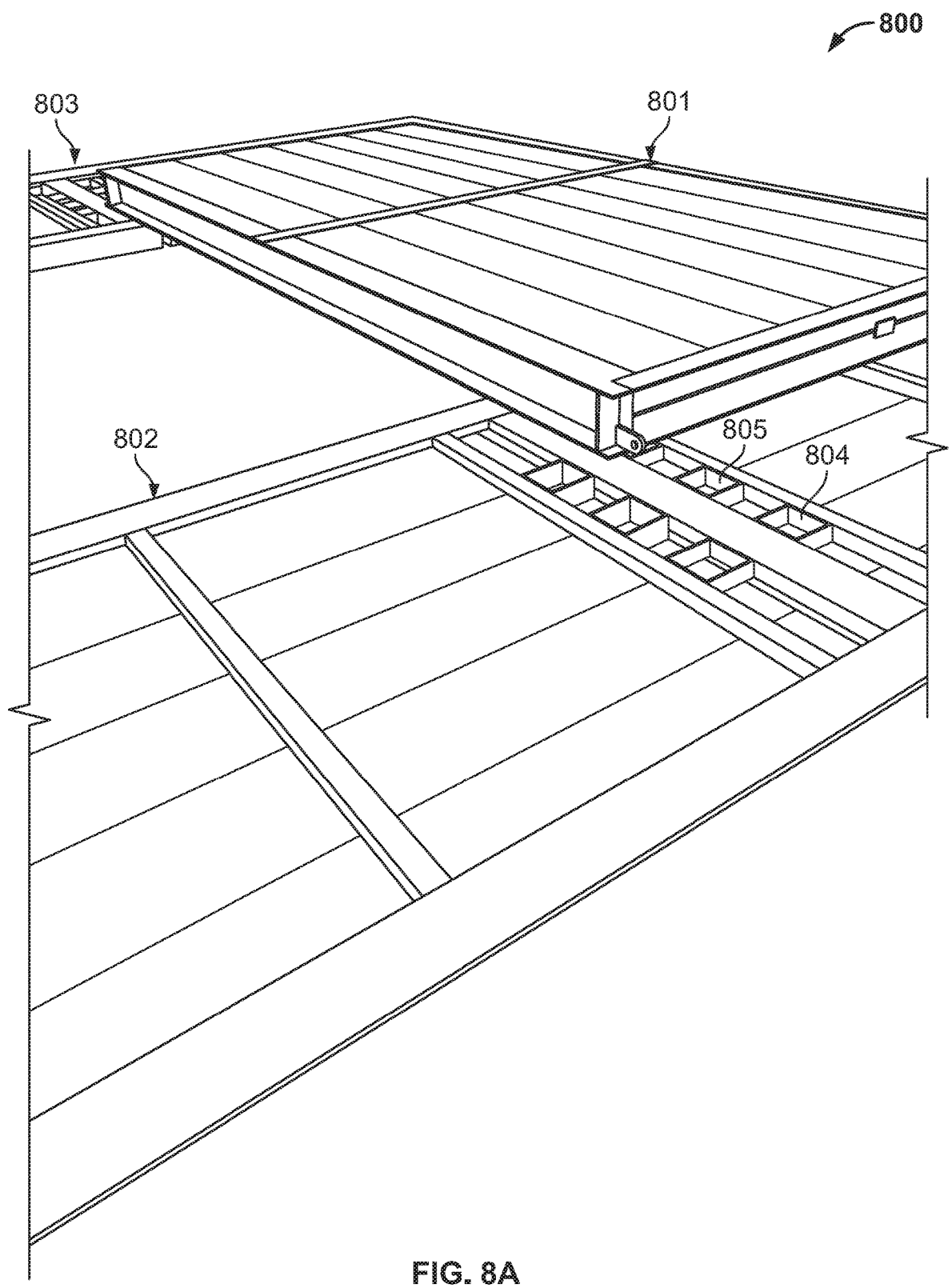
FIGS. 8A, 8B, 8C and 8D show a series of perspective views for assembling another embodiment of an adjustable ground cover mat.

FIG. 8A shows a perspective view of another example embodiment of an adjustable ground mat 800 with a different mechanical configuration. A span member 801 is connected to a first footing member 802 and a second footing member 803. Unoccupied peg holes 805, 804 are shown. As can be seen, the wood planks are positioned side-by-side. In other words, no metal bars are positioned between the lengths of the wood planks.

It will also be appreciated that at the bottom of each footing member, a substantially planar surface is formed by the wood planks the surround metal frame. In other words, the bottom surface of the wood planks and the bottom surface of the metal frame are substantially flush with each other. This creates a larger surface area on a footing member to support the weight of ground cover mat and the vehicles and equipment that drive over the ground cover mat.

Figure 8B:
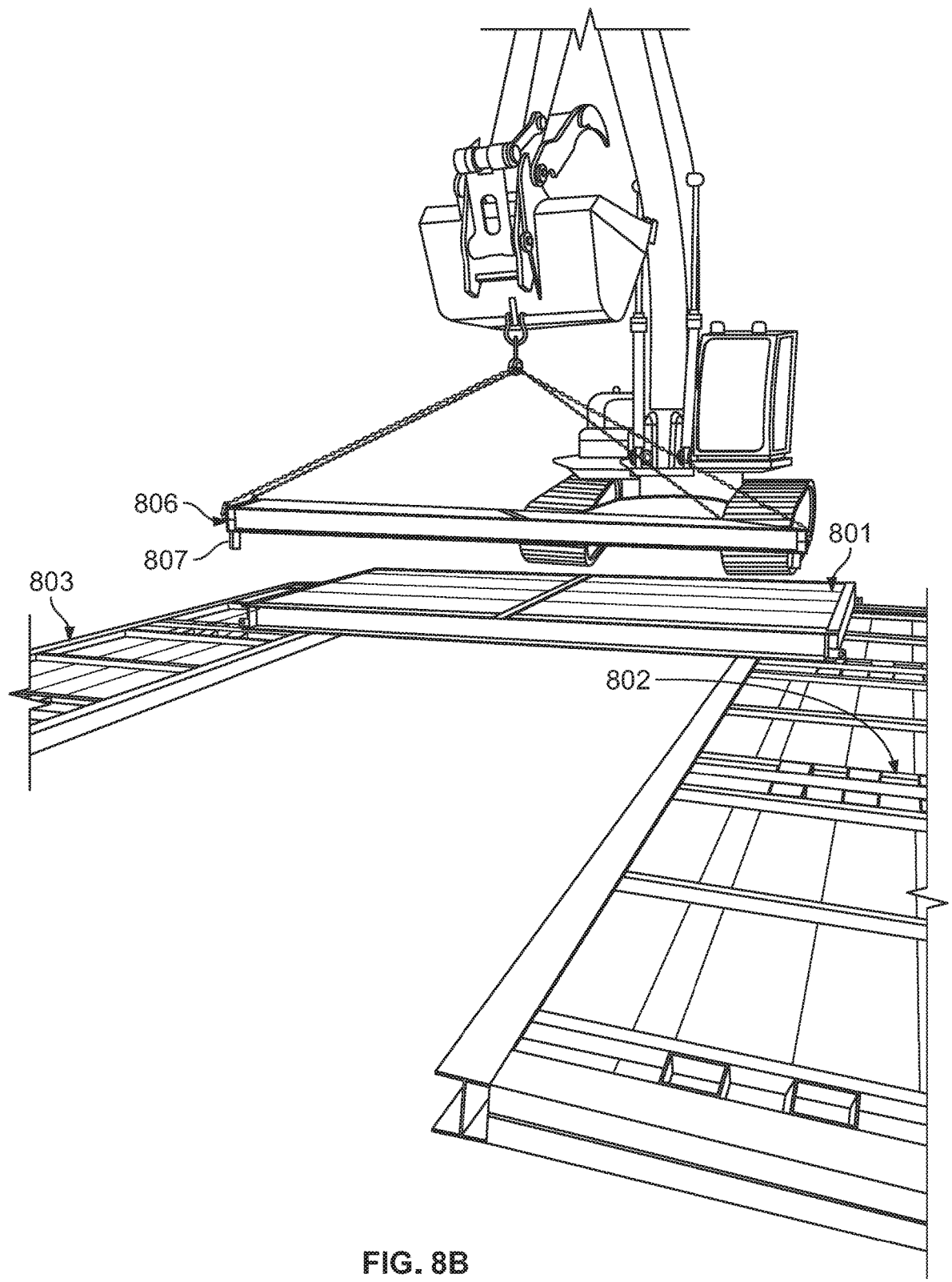

FIG. 8B shows a machine lifting another span member 806 to be assembled with the ground cover mat. One of the corner pegs 807 of the span member 806 is shown, which will be inserted into a peg hole in the footing member 803.

Figure 8C:
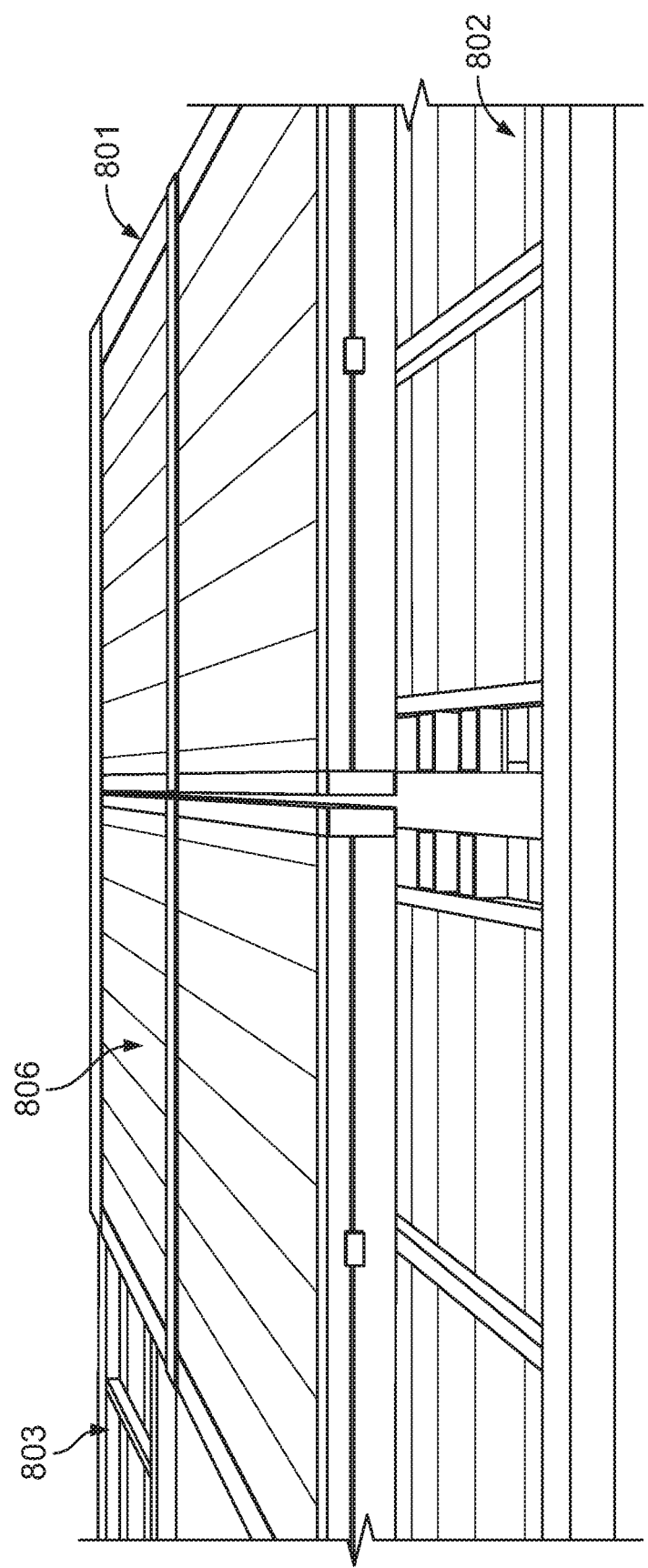

FIG. 8C shows the span member 806 assembled with the ground cover mat.

Figure 8D:
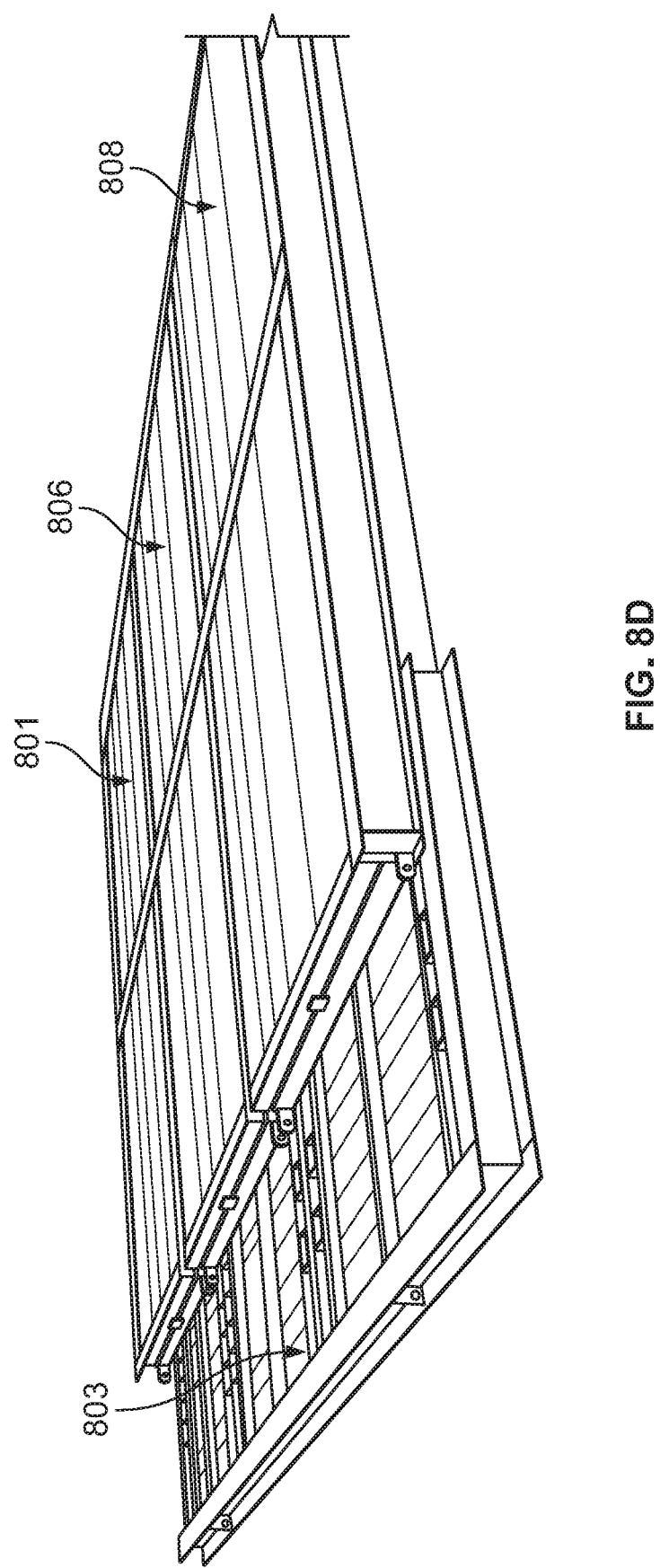

FIG. 8D shows the assembled ground cover mat, in this case, include three span members 801, 806 and 808.

Figure 9:
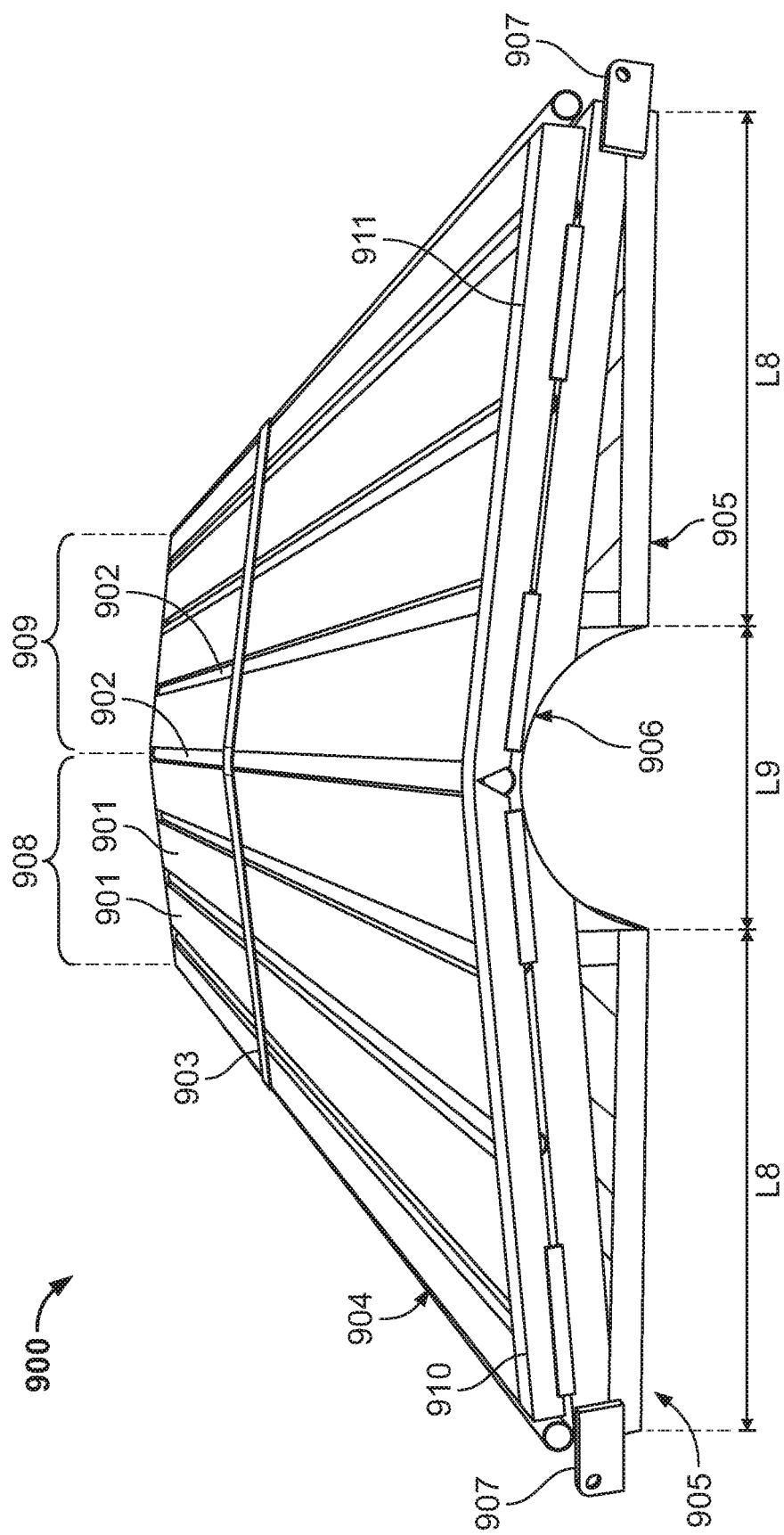
FIG. 9 is a perspective view of another example embodiment of a ground cover mat that includes wood planks positioned within the frame, and that can be used to cover surface lines.
Figure 10:
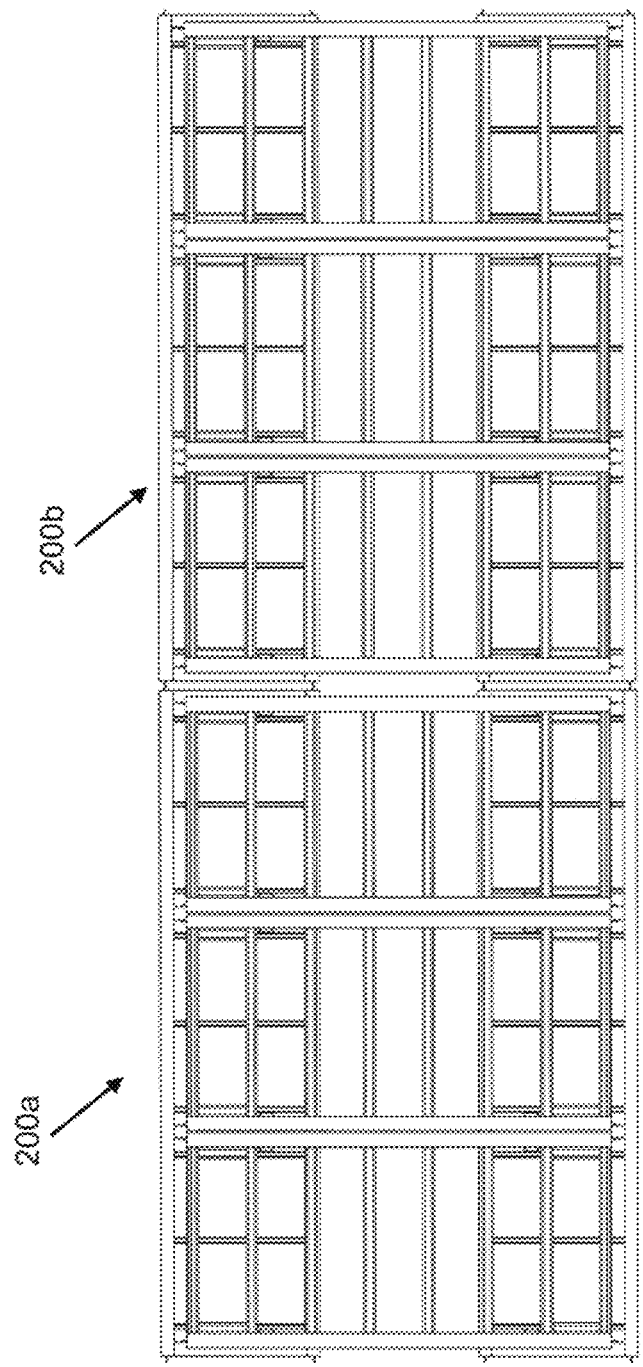
FIG. 10 is a top view of multiple ground cover mats that are connected together.

Turning to FIG. 9, another example of a ground cover mat 900 is provided. This example of a ground mat is steeped at the top and includes an arched void on the bottom. In particular, in the embodiment shown in FIG. 9, the ground cover mat includes a span member 804 and two footing members 805 positioned below the span member.

A line (e.g. a data cable, a power cable, a cable, a hose, a pipe, an elongate structure, etc.) placed on the ground surface could be protected by placing the ground cover mat 800 on top of the line. The surface line is positioned within the void. In this way, when a vehicle or equipment drives over the ground cover mat, the vehicle's weight or the equipment's weight is distributed around and away from the surface line.

This ground cover mat 900 can be installed by placing it over a line that is already positioned on the ground surface. Alternatively, the ground cover mat 900 is placed on the ground first, and the line is run through the arched void.

The span member 904 includes two portions 908, 909 with top surfaces that are angled relative to each other and meet at peak. The peak, in this example, is a pipe 902 located in the center of the span member 904. The span member is constructed from a metal frame that includes pipes 902 with wood planks 901 positioned between the pipes. A strap 903 or restraint extends over top of the wood planks to secure the wood planks within the frame. For example, the strap 903 is metal and is welded to the edges of the frame.

End caps 910 and 911 respectively cover the ends surfaces of the portions 908, 909. The end caps 910, 911 are angled to match the angles of the top surfaces. The end caps also help to hold the wood planks in place.

It will be appreciated that rough lumber may be used to form the wood planks. In an example aspect, the wood planks are rectangular pieces and do not have any notches. In other words, the wood planks can be easily and quickly formed by cutting the lumber to length. In another example, the wood planks are not held in place with screws, bolts, clips, adhesive or other types of similar fasteners. Therefore, assembling the wood planks with the metal frame requires less time, effort and components.

The two footing members 905 are positioned under the span member. A portion of a tube 906, forming a semi-circle, is placed under the span member and between the two footing member. This tube 906 forms an arch-shaped void. The width L9 of the void is much smaller than the width L8 of the footing members. In this way, the weight of the vehicle driving on the ground cover mat is distributed over a wider area.

In a non-limiting example embodiment, the width L9 of the void is 24 inches, such that the height of the arch is 12 inches. However, other dimensions are also applicable.

In an example embodiment, the L8 is approximately 1.7 times greater than L9. In another example embodiment, L8 is approximately n times greater than L9, where n is approximately 1.4 or more. In another example embodiment, n is approximately 1.7 or more.

The portion of the tube 906 is used provide a continuous and smooth surface, which may potentially be in contact with the surface line. In this way, as the surface line is moved while within the void, there is less risk of the surface line being damaged by the ground cover mat 900.

Although an arched-shaped void is shown, it will be appreciated that the void may have different cross-sectional shapes, such as triangular, rectangular, pentagonal, or other shapes.

At each of the four corners of the ground cover mat 900, lugs 907 are positioned to facilitate connecting two or more ground cover mats together in series, one after the other. In particular, a bolt passes through a lug of a first ground cover mat and a lug of a second ground cover mat. In other words, multiple ones of the ground cover mats may be connected together to make a cover over a length of a surface line.

Below are examples of general example embodiments and related example aspects.

In a general example embodiment, a ground cover mat includes two footing members spaced at a spanning distance from each other. Each of the footing members include a first lengthwise outer edge and a second lengthwise outer edge. In an example embodiment, these are not parallel edges to each other. In another example, these edges are parallel to each other. Each of the footing members define therein multiple peg holes, and each of the peg holes are spaced at different distances from the first lengthwise outer edge. One or more span members are also included and each of the span members are positioned above and are removably attached to the two footing members. Each of the one or more span members include at least two pegs that protrude downwards, wherein one of the pegs removably fit into a given peg hole defined in one of the two footing members and another one of the pegs removably fit into a given peg hole defined in another one of the two footing members. Similarly, a kit of parts including these components is also herein encompassed.

In another general example embodiment, a system for a ground cover mat includes two footing members configured to be spaced at a spanning distance from each other. Each of the footing members include a first lengthwise outer edge and a second lengthwise outer edge. In an example embodiment, these are not parallel edges to each other. In another example, these edges are parallel to each other. Each of the footing members define therein multiple peg holes. Each of the peg holes are spaced at different distances from the first lengthwise outer edge. One or more span members are also included, and each of the span members are configured to be positioned above and removably attached to the two footing members. Each of the one or more span members include at least two pegs that protrude downwards, wherein one of the pegs removably fit into a given one of the pegs holes defined in one of the two footing members and another one of the pegs removably fit into a given one of the peg holes defined in another one of the two footing members. The system also includes one or more ground spikes that are configured to be removably positioned into one or more peg holes that are unoccupied by the pegs, and the one or more ground spikes are configured to be driven into a ground surface below the footing members.

In another general example embodiment, a method for assembling a ground cover mat includes laying down two footing members on a ground surface. The two footing members are spaced at a spanning distance from each other and oriented substantially parallel to each other. Each of the footing members include a first lengthwise outer edge and a second lengthwise outer edge. Each of the footing members define therein multiple peg holes, and each of the peg holes are spaced at different distances from the first lengthwise outer edge. The method further includes driving one or more ground spikes through one or more peg holes defined in each of the footing members, such that the ground spikes are driven into the ground surface. The method further includes placing one or more span members above and removably attached to the two footing members, Each of the one or more span members include at least two pegs that protrude downwards, wherein one of the pegs are removably fitted into a given one of the pegs holes defined in one of the two footing members and another one of the pegs are removably fitted into a given one of the peg holes defined in another one of the two footing members. Furthermore, the given one of the pegs holes defined in the one of the two footing members and the given one of the peg holes defined in the another one of the two footing members are unoccupied by the ground spikes.

In a general example embodiment, an adjustable ground cover mat includes two footing members that are spaced at a spanning distance from each other. Each of the footing members include a first lengthwise outer edge and a second lengthwise outer edge that are substantially parallel to each other. Each of the footing members define therein multiple pairs of peg holes, and each pair of peg holes spaced at different distances from the first lengthwise outer edge. The peg holes within each pair of peg holes are spaced apart from each other by a first distance. The ground cover mat also includes one or more span members, with each of the span members positioned above and removably attached to the two footing members. In particular, each of the one or more span members include at least two pairs of pegs that protrude downwards, and the pegs within each of the pair of pegs are spaced apart from each other by the first distance. One pair of pegs removably fit into a given pair of pegs holes defined in one of the two footing members and another pair of pegs removably fit into a given pair of peg holes defined in another one of the two footing members.

In an example aspect of the ground cover mat, the spanning distance between the two footing members is adjusted by placing the one pair of pegs into a different given pair of peg holes defined in the one of the two footing members, or by placing the another pair of pegs into a different given pair of peg holes defined in the another one of the two footing members, or both.

In another example aspect of the ground cover mat, at least one or more pairs of peg holes defined in each of the footing members are unoccupied by the pegs, resulting in unoccupied peg holes defined in each footing member, and wherein one or more ground spikes are removably positioned through one or more of the unoccupied peg holes defined in each of the footing members.

In another example aspect of the ground cover mat, each of the one or more ground spikes have a cross-section shape that is complimentary to each of the peg holes' cross-section shape.

In another example aspect of the ground cover mat, each of the pegs have a cross-section shape that is complimentary to each of the peg holes' cross-section shape.

In another example aspect of the ground cover mat, each of the peg holes' cross-section shape is square-shaped with rounded corners.

In another example aspect of the ground cover mat, each of the one or more span members are constructed from a metal frame and planks. In particular, the metal frame includes two outer beams connected by multiple cross bars and a given plank is positioned between a given two of the cross bars.

In another example aspect of the ground cover mat, the two outer beams include an upper flange, a lower flange and a web that is positioned between the upper flange and the lower flange, and at least one of the upper flange and the lower flange overlap the planks to secure the planks to a given span member.

In another example aspect of the ground cover mat, the planks are planks of rough lumber.

In another example aspect of the ground cover mat, there are two or more lugs positioned at one side of the ground cover mat. Each of these lugs protrude outwards and are oriented to mate with lugs of an adjacent ground cover mat.

In another example aspect, an assembly of these ground cover mats is provided wherein multiple mats are arranged together and wherein adjacent mats are connected together.

In another general example embodiment, a kit of parts is provided, that when assembled form a ground cover mat. The kit of parts include two footing members that each include a first lengthwise outer edge and a second lengthwise outer edge that are substantially parallel to each other.

Each of these footing members define therein multiple pairs of peg holes, and each pair of peg holes are spaced at different distances from the first lengthwise outer edge. The peg holes within each pair of peg holes are spaced apart from each other by a first distance. The kit of parts further includes one or more span members having a first length. Each of the span members are configured to be positioned above and removably attached to the two footing members. In particular, each of the one or more span members include at least two pairs of pegs that protrude downwards, and the pegs within each of the pair of pegs are spaced apart from each other by the first distance. One pair of pegs removably fit into a given pair of pegs holes define in one of the two footing members and another pair of pegs removably fit into a given pair of peg holes defined in another one of the two footing members.

In an example aspect of the kit of parts, there is also one or more span members having a second length, with the second length being different than the first length. In particular, the one more span members having the second length are used to replace the one or more span members having the first length. In this way the spanning distance of the ground cover mat may be further adjusted or varied.

In another example aspect of the kit of parts, each of the one or more span members having the second length include at least two pairs of pegs that protrude downwards, and the pegs within each of the pair of pegs are spaced apart from each other by the first distance. One pair of pegs of a given one of the span members having the second length removably fit into the given pair of pegs holes define in one of the two footing members and another pair of pegs of the given one of the span members having the second length removably fit into the given pair of peg holes defined in another one of the two footing members.

In another example aspect of the kits of parts, a spanning distance between the two footing members is adjusted by placing the one pair of pegs into a different given pair of peg holes defined in the one of the two footing members, or by placing the another pair of pegs into a different given pair of peg holes defined in the another one of the two footing members, or both.

In another example aspect of the kit of parts, there are also one or more ground spikes. For example, the one or more ground spikes have a cross-section shape that is complimentary to each of the peg holes' cross-section shape.

In another example aspect of the kit of parts, each of the pegs have a cross-section shape that is complimentary to each of the peg holes' cross-section shape.

In another example aspect of the kit of parts, each of the peg holes' cross-section shape is square-shaped with rounded corners.

In another example aspect of the kit of parts, each of the one or more span members are constructed from a metal frame and planks, wherein the metal frame includes two outer beams that are connected by multiple cross bars. A given plank is positioned between a given two of these cross bars.

In another example aspect of the kit of parts, the two outer beams include an upper flange, a lower flange and a web that is positioned between the upper flange and the lower flange, and at least one of the upper flange and the lower flange overlap the planks to secure the planks to a given span member.

In another example aspect of the kit of parts, the planks are planks of rough lumber.

In another example aspect of the kit of parts, each of the footing members include two or more lugs positioned at least on one side of each of the footing members, and each of the lugs protrude outwards and are oriented to mate with lugs of an adjacent ground cover mat.

In another example aspect of the kit of parts, there are also bolts that are configured to be positioned through a hole defined in each of the lugs. In this way, adjacent ground cover mats can be connected together.

In another general example embodiment, a system for a ground cover mat includes two footing members configured to be spaced at a spanning distance from each other. Each of the footing members include a first lengthwise outer edge and a second lengthwise outer edge that are substantially parallel to each other. Each of the footing members define therein multiple pairs of peg holes, and each pair of peg holes are spaced at different distances from the first lengthwise outer edge. The peg holes within each pair of peg holes are spaced apart from each other by a first distance. The system further includes one or more span members, each of the span members configured to be positioned above and removably attached to the two footing members. In particular, each of the one or more span members include at least two pairs of pegs that protrude downwards, and the pegs within each of the pair of pegs are spaced apart from each other by the first distance. One pair of pegs are configured to removably fit into a given pair of pegs holes defined in one of the two footing members and another pair of pegs are configured to removably fit into a given pair of peg holes defined in another one of the two footing members. The system also includes one or more ground spikes configured to be removably positioned into one or more peg holes that are unoccupied by the pegs, and the one or more ground spikes are configured to be driven into a ground surface below the footing members.

In an example aspect of the system, the spanning distance between the two footing members is adjustable by placing the one pair of pegs into a different given pair of peg holes defined in the one of the two footing members, or by placing the another pair of pegs into a different given pair of peg holes defined in the another one of the two footing members, or both.

In another general example embodiment, a method is provided for assembling a ground cover mat. The method includes laying down two footing members on a ground surface. The two footing members spaced at a spanning distance from each other and oriented substantially parallel to each other. Each of the footing members include a first lengthwise outer edge and a second lengthwise outer edge that are substantially parallel to each other. Each of the footing members define therein multiple pairs of peg holes, and each pair of peg holes are spaced at different distances from the first lengthwise outer edge. The peg holes within each pair of peg holes are spaced apart from each other by a first distance. The method further includes driving one or more ground spikes through one or more peg holes defined in each of the footing members. For example, the ground spikes are driven into the ground surface. The method further includes placing one or more span members above and removably attached to the two footing members. In particular, each of the one or more span members include at least two pairs of pegs that protrude downwards, and the pegs within each of the pair of pegs are spaced apart from each other by the first distance. One pair of pegs are removably fitted into a given pair of pegs holes defined in one of the two footing members and another pair of pegs are removably fitted into a given pair of peg holes defined in another one of the two footing members. The given pair of pegs holes defined in the one of the two footing members and the given pair of peg holes defined in the another one of the two footing members are unoccupied by the ground spikes.

In another general example embodiment, a ground cover mat includes two footing members spaced at a spanning distance from each other, and one or more span members. Each of the span members are positioned above and attached to the two footing members. Each of the one or more span members are constructed from a metal frame and planks, and the metal frame includes two outer beams connected by multiple cross bars. In particular, a given plank is positioned between a given two of the cross bars. The two outer beams include an upper flange, a lower flange and a web that is positioned between the upper flange and the lower flange. At least one of the upper flange and the lower flange overlap the planks to secure the planks to a given span member. In a further example aspect, the multiple cross bars have at least a partially rounded cross-section, and the planks are rough lumber.

In another general example embodiment, a ground cover mat includes two footing members spaced at a spanning distance from each other, and one or more span members. Each of the span members are positioned above and attached to the two footing members. Each of the one or more span members are constructed from a metal frame and wood planks, In particular, the metal frame includes two outer beams connected by multiple cross bars and a given wood plank is positioned between a given two of the cross bars. Each of the cross bars have a rounded cross-section or a partially rounded cross-section. The two outer beams include an upper flange, a lower flange and a web that is positioned between the upper flange and the lower flange. At least one of the upper flange and the lower flange overlap the wood planks to secure the wood planks to a given span member. In a further example aspect, the wood planks are rough lumber.

It will be appreciated that features of the mechanical configuration of the ground cover mat may differ from what is shown and described.

It will be appreciated that different features of the example embodiments of the ground cover mat, the method, the kit of parts and the system, as described herein, may be combined with each other in different ways. In other words, different components and features may be used together according to other example embodiments, although not specifically stated.

The steps or operations in the flow diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific embodiments, various modifications thereof will be apparent to those skilled in the art without departing from the scope of the claims appended hereto.

The invention claimed is:

1. A ground cover mat comprising:
two footing members spaced at a spanning distance from each other, each of the footing members comprising a first lengthwise outer edge and a second lengthwise outer edge;
wherein each of the footing members includes multiple peg holes, the peg holes being spaced at different distances from the first lengthwise outer edge;
one or more span members, each of the span members being positioned above and removably attached to the two footing members;
wherein each of the one or more span members includes at least two downwardly projecting pegs, wherein one of the pegs removably fits into a first peg hole provided in one of the two footing members and another one of the pegs removably fits into a second peg hole provided in the other of the two footing members;
wherein each of the pegs has a cross-sectional shape that is complementary to the cross-sectional shape of the respective peg hole;
and wherein each of the one or more span members is constructed from a metal frame and planks, wherein the metal frame comprises two outer beams connected by multiple cross bars and a given plank is positioned between a given two of the cross bars.

2. The ground cover mat of claim 1 wherein the spanning distance between the two footing members is adjusted by placing the one of the pegs into a different peg hole defined in the one of the two footing members, and/or by placing the another one of the pegs into a different peg hole defined in the other of the two footing members.

3. The ground cover mat of claim 1 wherein at least one or more of the peg holes of the footing members are unoccupied by the pegs, resulting in unoccupied peg holes defined in each footing member, and wherein one or more ground spikes are removably positioned through one or more of the unoccupied peg holes defined in each of the footing members.

4. The ground cover mat of claim 3 wherein each of the one or more ground spikes has a cross-sectional shape that is complementary to the cross-sectional shape of the peg holes.

5. The ground cover mat of claim 1 wherein each of the peg holes has a cross-sectional shape that is substantially square-shaped.

6. The ground cover mat of claim 1 wherein each of the two outer beams comprises an upper flange, a lower flange and a web extending between the upper flange and the lower flange, and at least one of the upper flange and the lower flange overlaps the planks to secure the planks to a given span member.

7. The ground cover mat of claim 1 wherein the planks are wood planks comprising rough lumber.

8. The ground cover mat of claim 1 further comprising two or more lugs positioned at one side of the ground cover mat, each of the lugs protruding outwards and oriented to mate with lugs of an adjacent ground cover mat.

9. A ground cover mat comprising:
two footing members spaced at a spanning distance from each other, each of the footing members comprising a first lengthwise outer edge and a second lengthwise outer edge that are substantially parallel to each other;
wherein each of the footing members includes pairs of peg holes, the peg holes being spaced at different distances from the first lengthwise outer edge, and the peg holes within each pair of peg holes being spaced apart from each other by a first distance;
one or more span members, each of the span members being positioned above and removably attached to the two footing members;
wherein each of the one or more span members comprises at least two pairs of downwardly projecting pegs, and the pegs within each of the pair of pegs are spaced apart from each other by the first distance, wherein one pair of pegs removably fits into a first pair of peg holes provided in one of the two footing members and another pair of pegs removably fits into a second pair of peg holes provided in another one of the two footing members;

wherein each of the pegs has a cross-sectional shape that is complementary to the cross-sectional shape of the respective peg hole;

and wherein each of the one or more span members is constructed from a metal frame and planks, wherein the metal frame comprises two outer beams connected by multiple cross bars and a given plank is positioned between a given two of the cross bars.

\* \* \* \* \*